M. J. MILMOE.
BOX MAKING MACHINE.
APPLICATION FILED JAN. 9, 1915.

1,267,101.

Patented May 21, 1918.
16 SHEETS—SHEET 2.

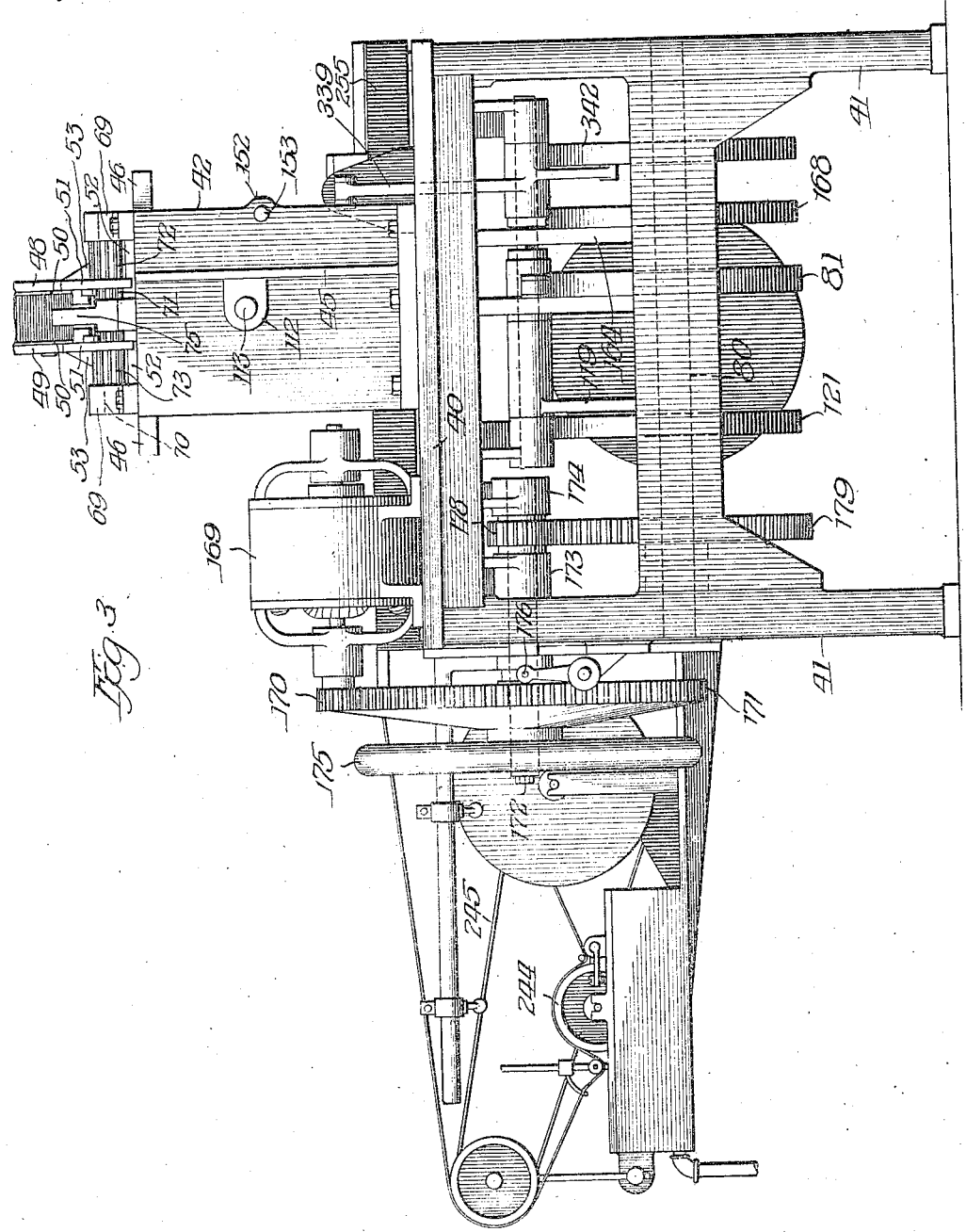

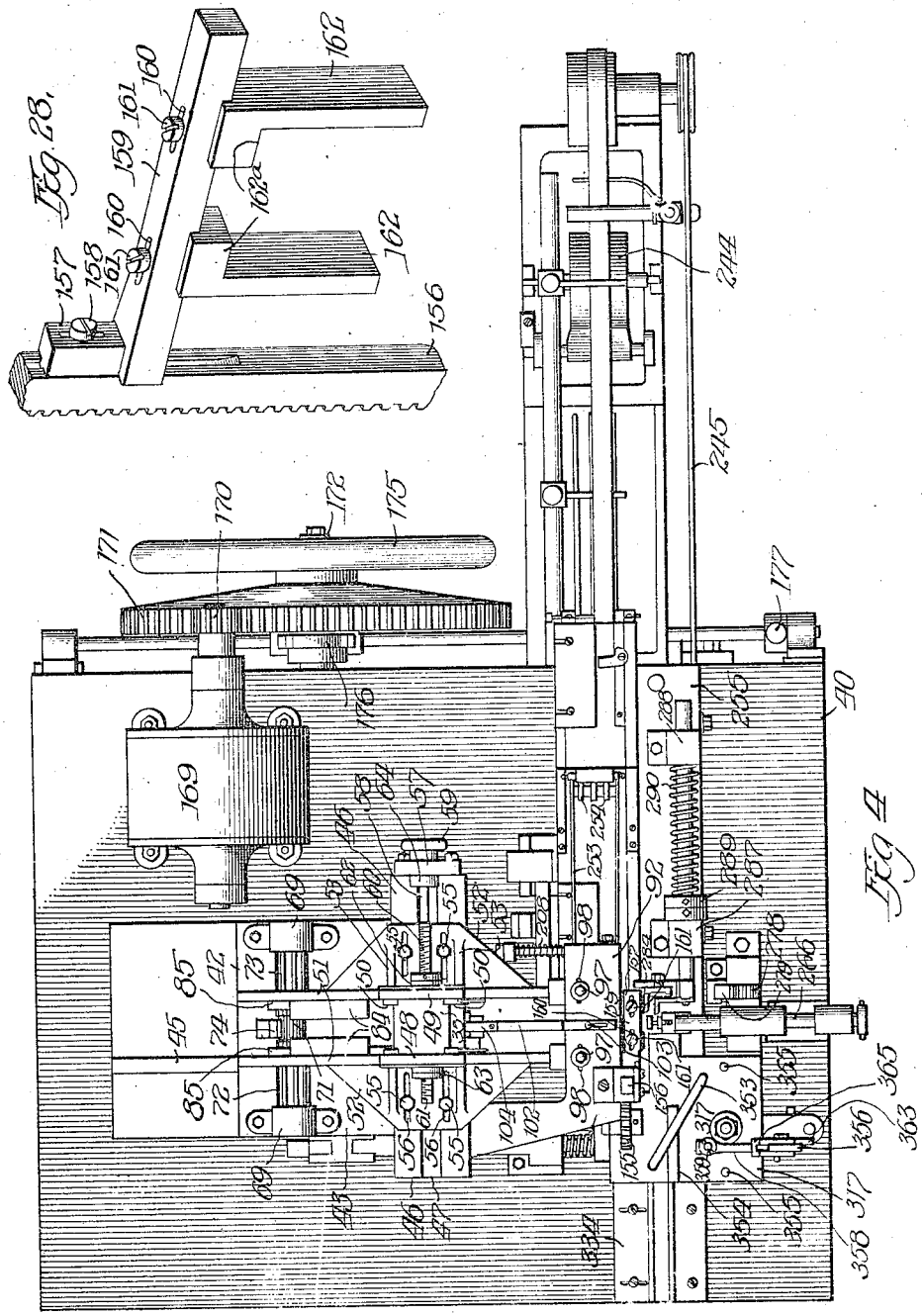

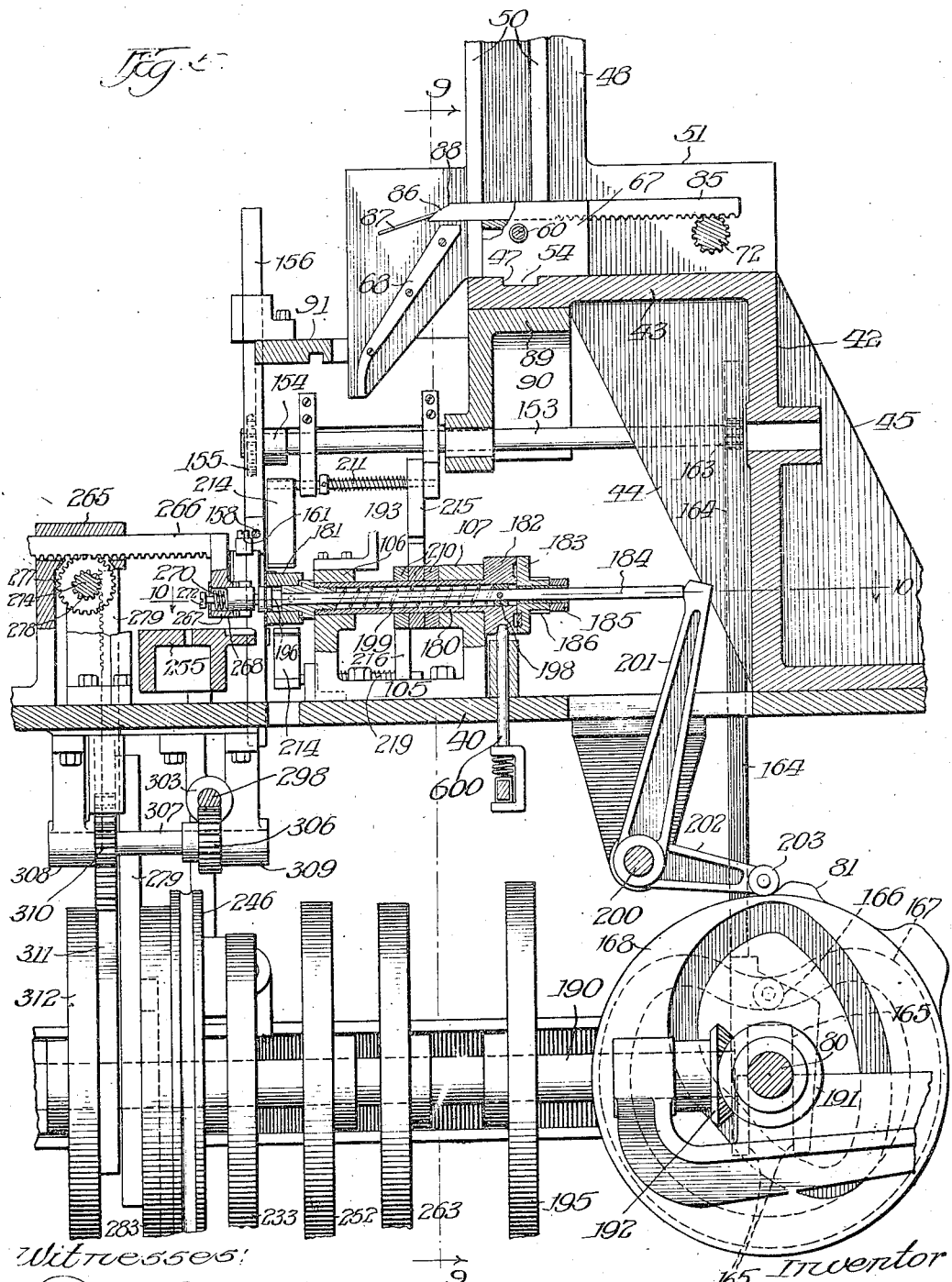

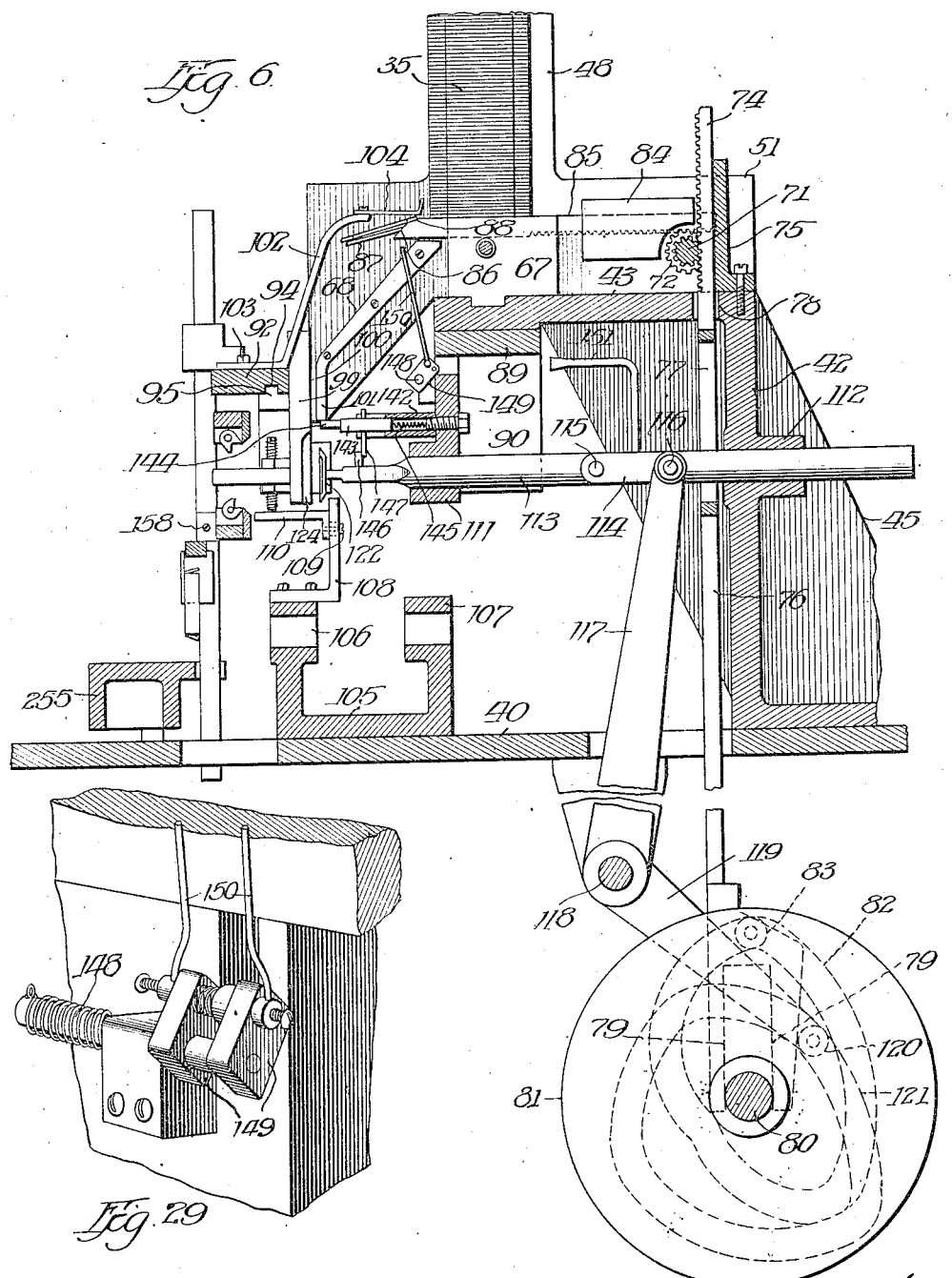

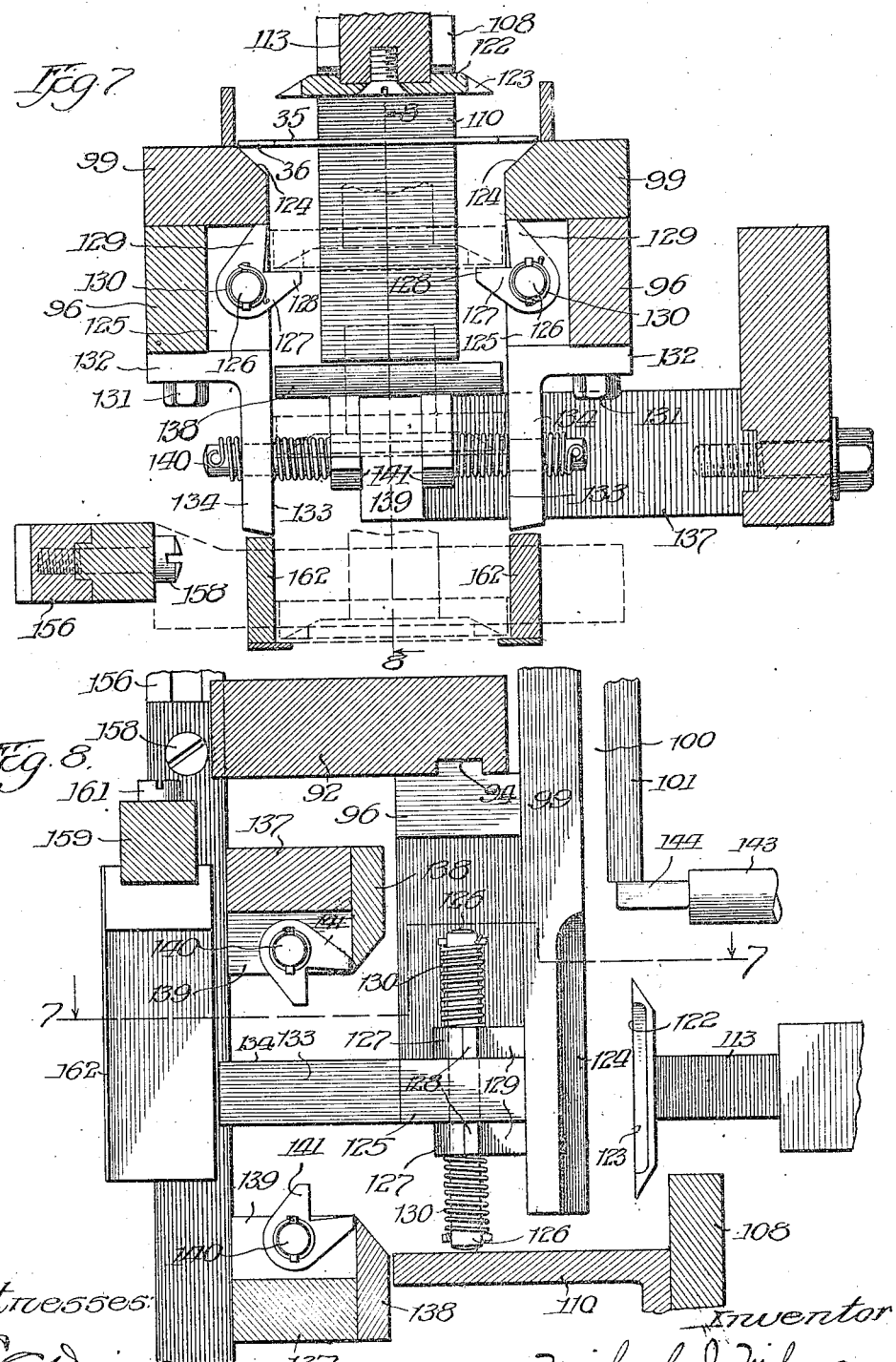

M. J. MILMOE.
BOX MAKING MACHINE.
APPLICATION FILED JAN. 9, 1915.
1,267,101.
Patented May 21, 1918.
16 SHEETS—SHEET 8.
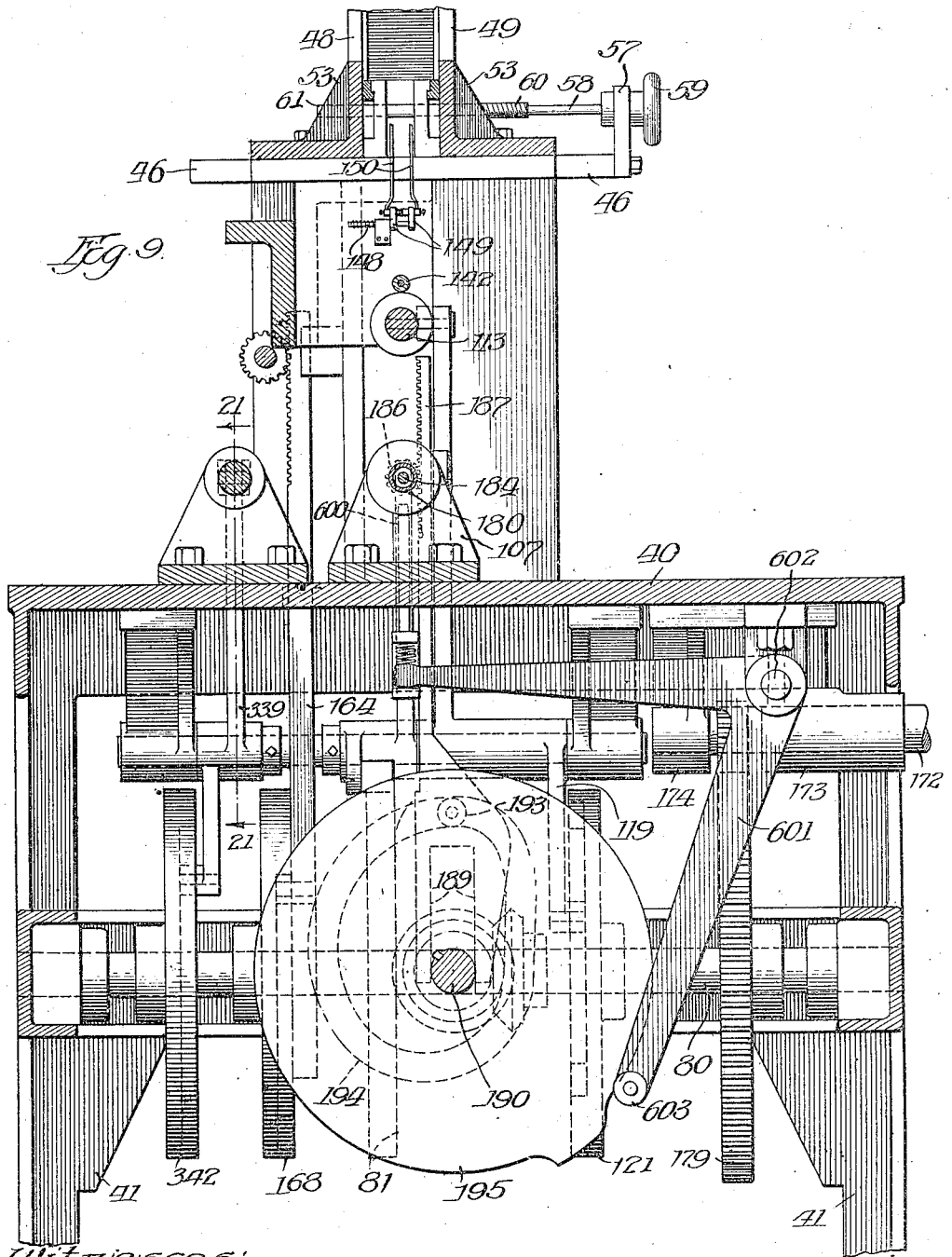

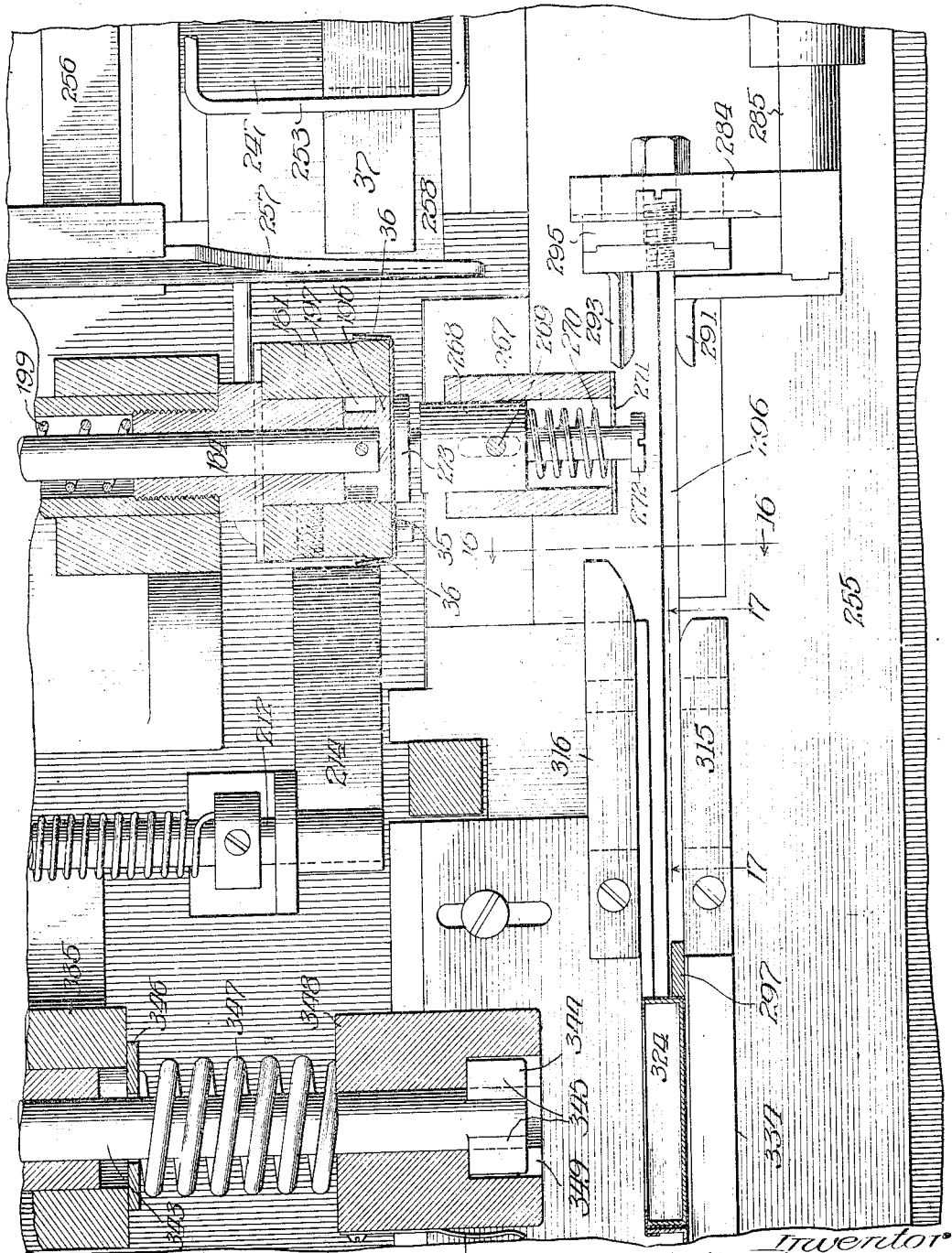

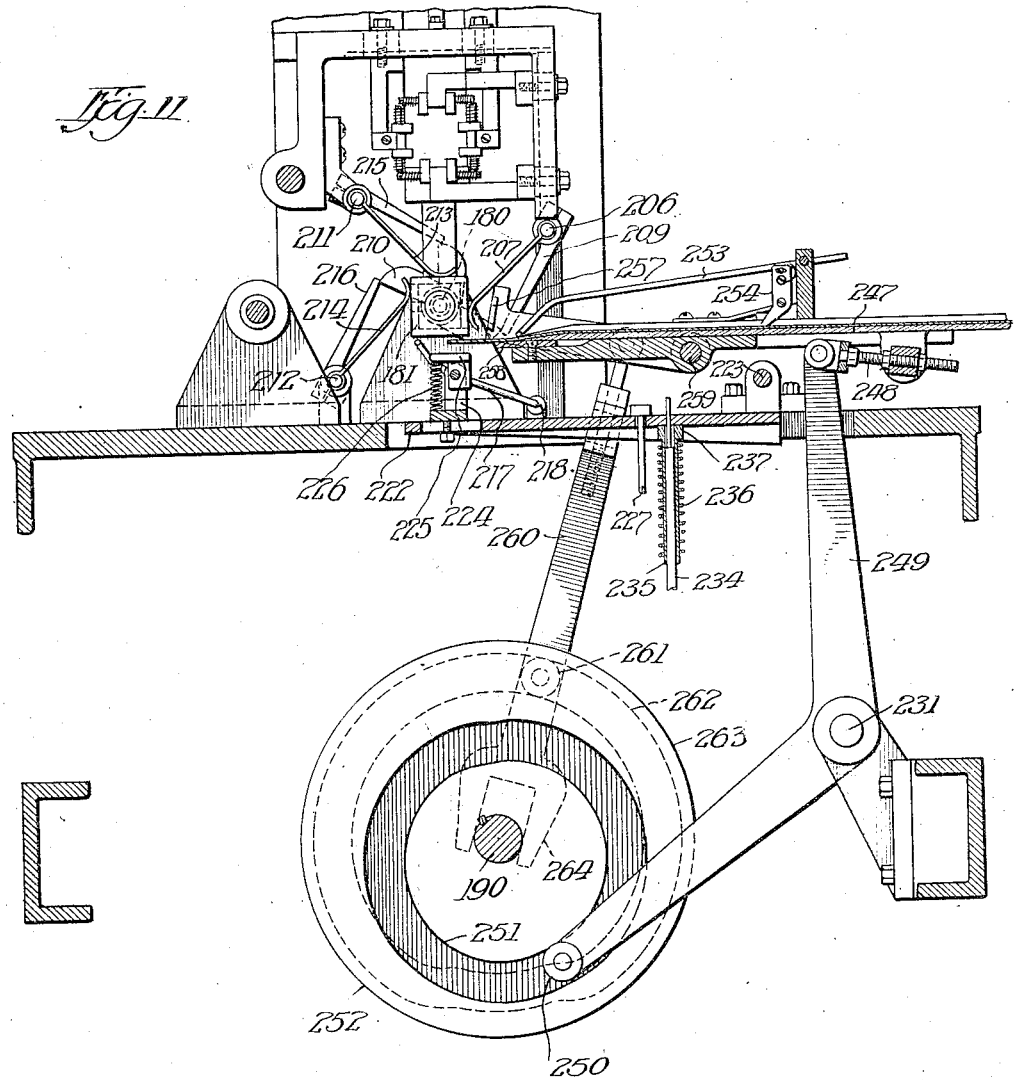

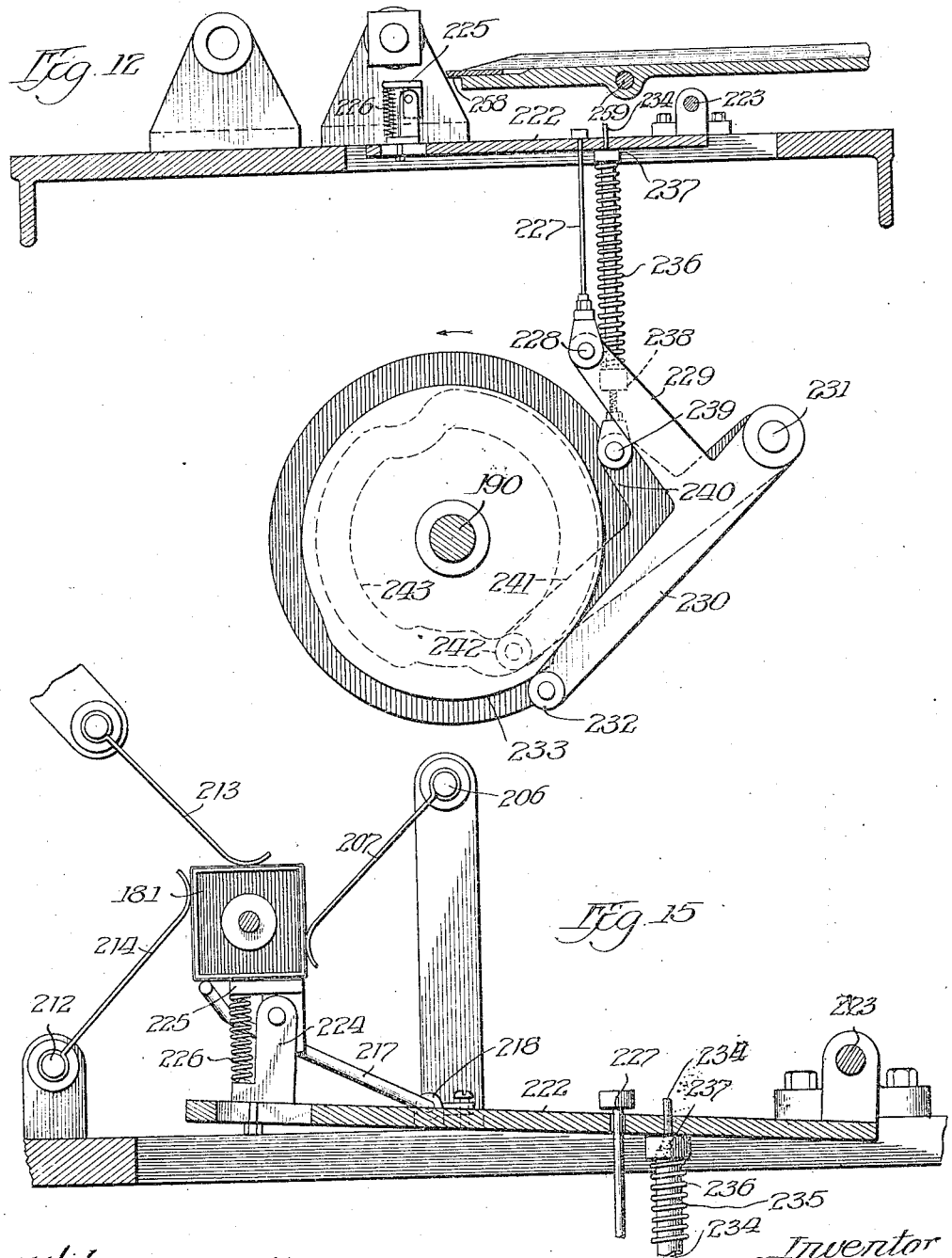

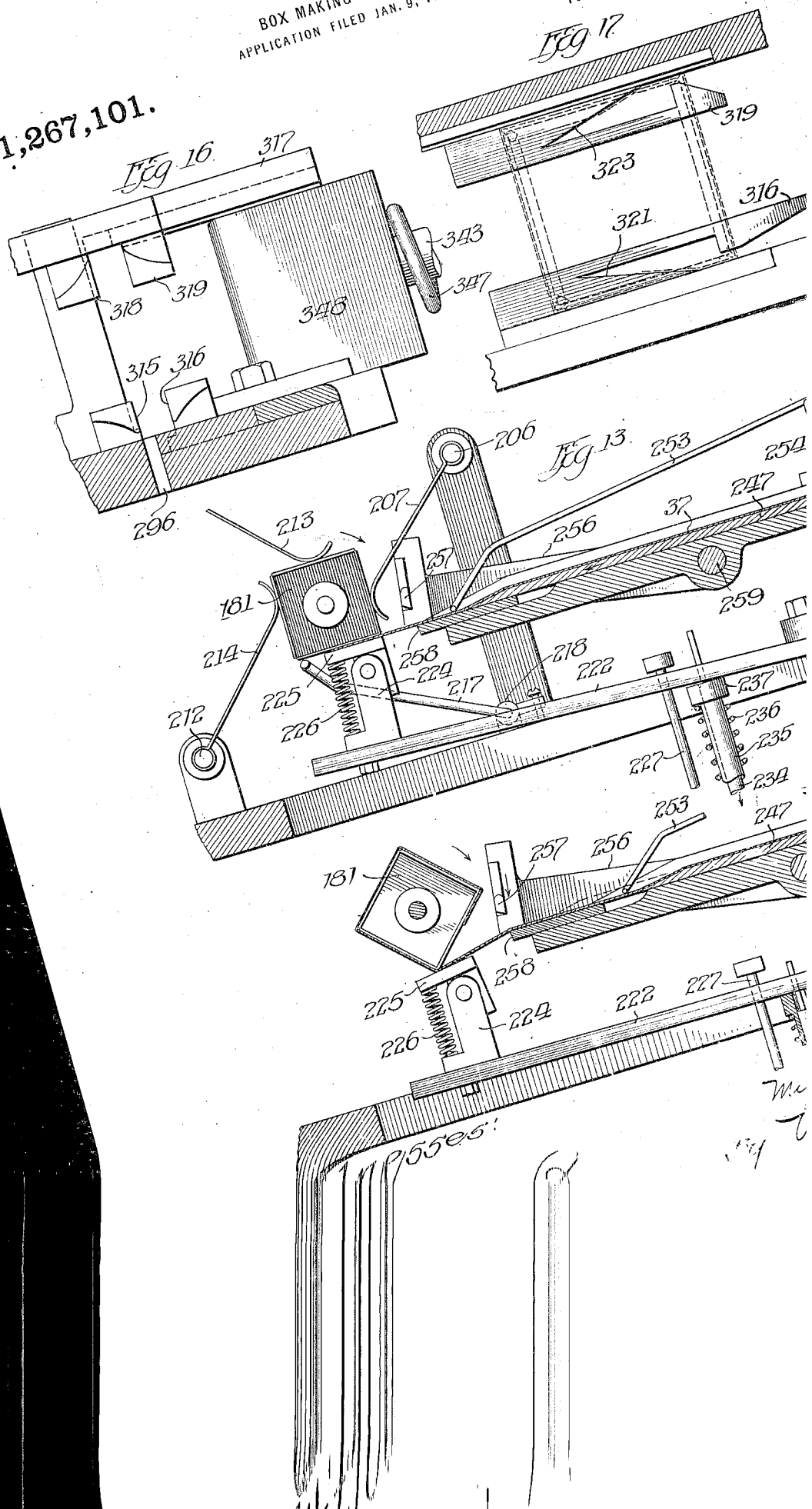

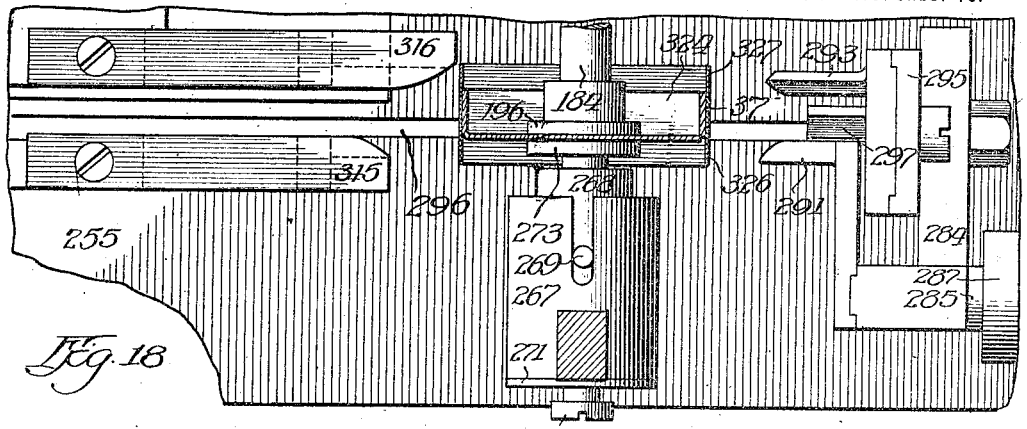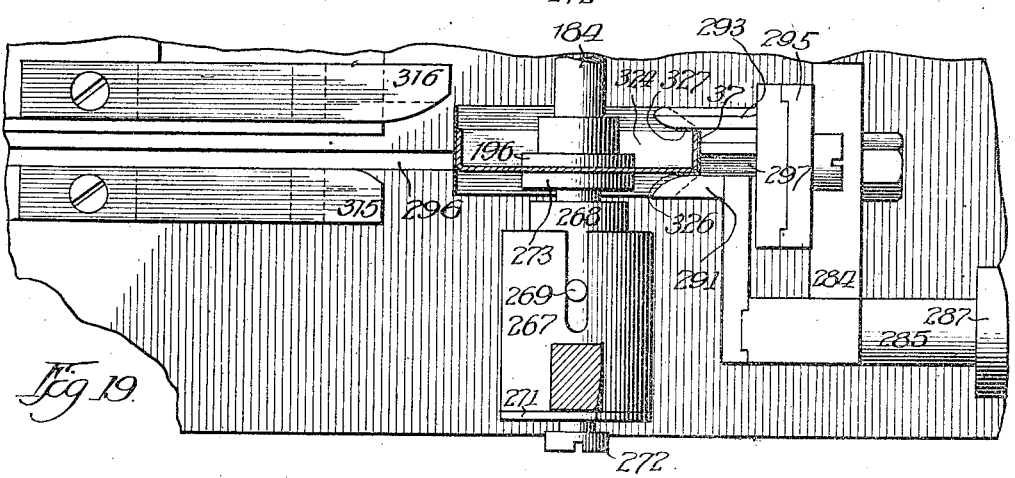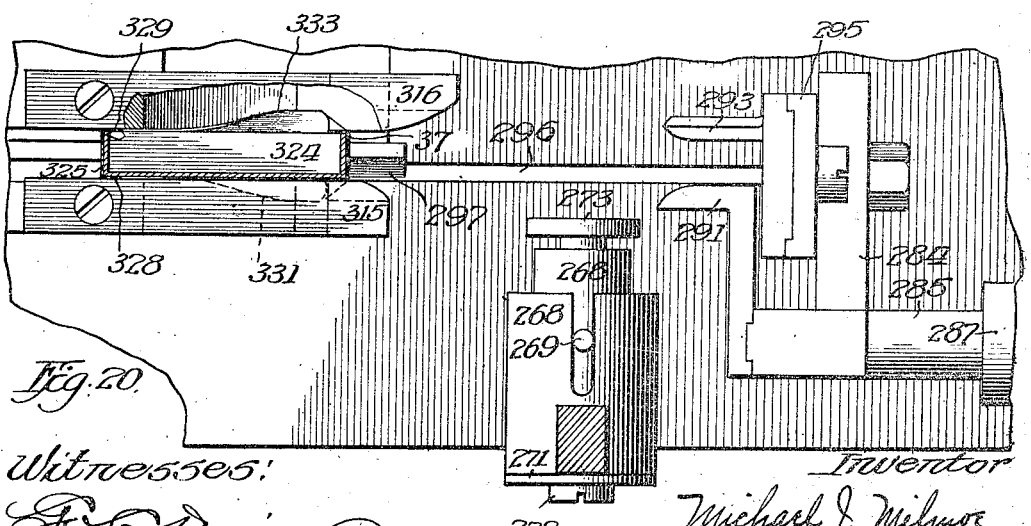

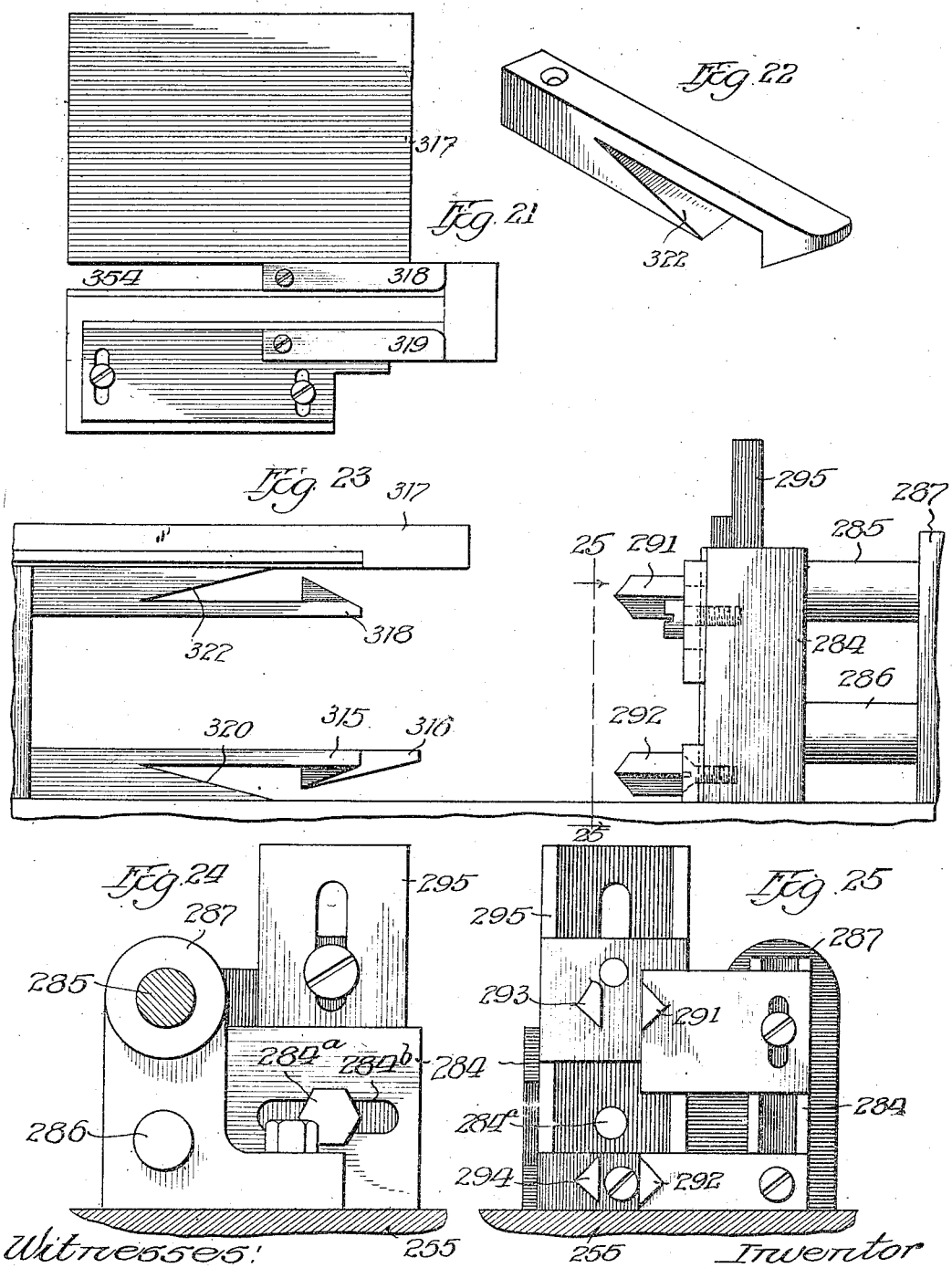

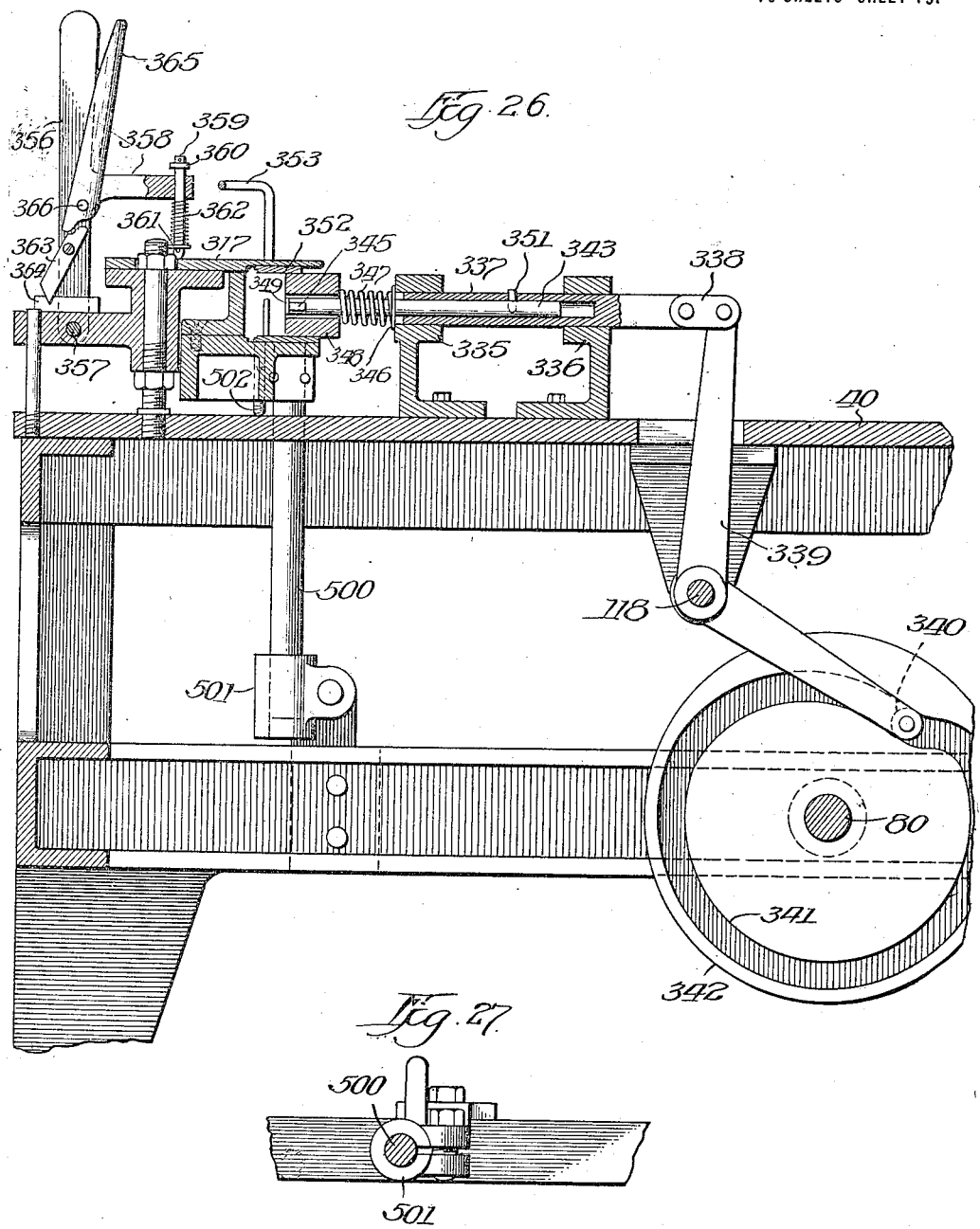

M. J. MILMOE.
BOX MAKING MACHINE.
APPLICATION FILED JAN. 9, 1915.
1,267,101.
Patented May 21, 1918.
16 SHEETS—SHEET 16.
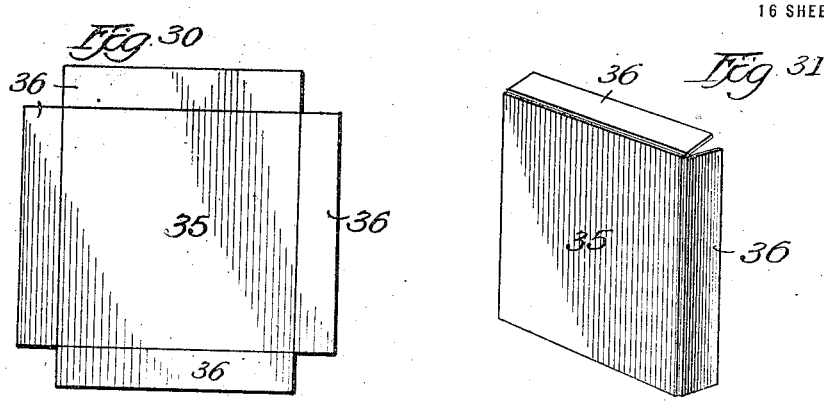
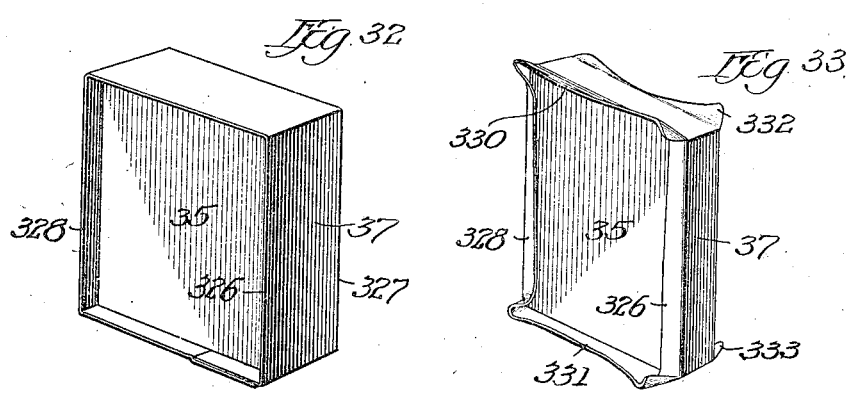
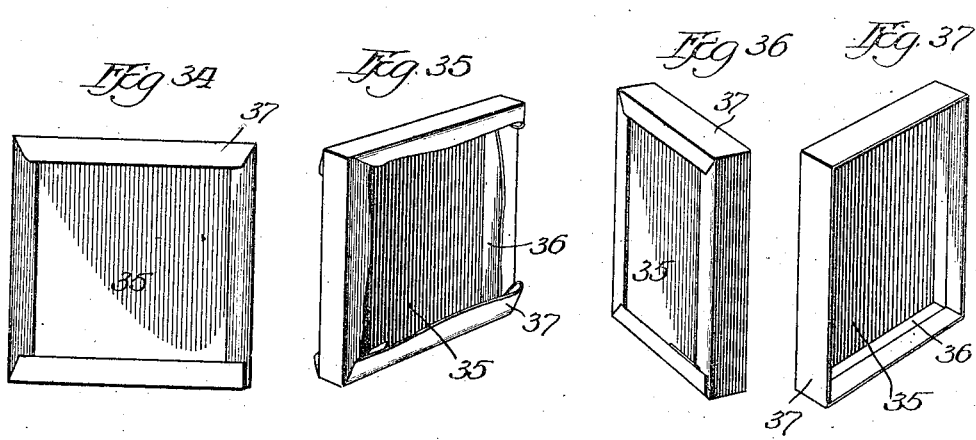

UNITED STATES PATENT OFFICE.

MICHAEL J. MILMOE, OF CHICAGO, ILLINOIS, ASSIGNOR TO W. C. RITCHIE & COMPANY, OF CHICAGO, ILLINOIS, A CORPORATION OF ILLINOIS.

BOX-MAKING MACHINE.

1,267,101. Specification of Letters Patent. Patented May 21, 1918.

Application filed January 9, 1915. Serial No. 1,274.

*To all whom it may concern:*

Be it known that I, MICHAEL J. MILMOE, a citizen of the United States, residing at Chicago, in the county of Cook and State of Illinois, have invented certain new and useful Improvements in Box-Making Machines, of which the following is a specification.

Stated in general terms, the primary purpose of the present invention is the production of a machine which will rapidly and economically manufacture pasteboard box elements or trays from cardboard or other suitable blanks, cover the sides of the box with finishing material, such as paper, and fold the protruding, opposite edge portions of such material down onto the head of the box and also into the open mouth of the box and against the inner faces of its side walls. To effect these operations expeditiously, they are performed successively at different points in the travel of the box through the machine, whereby the latter is capable of operating on a plurality of boxes at the same time, thereby enlarging the capacity of the machine.

A further feature of the invention resides in the capability of the parts of the machine for expansion and contraction, adapting them for the production of covered boxes of widely different sizes.

Various other points of novelty and improvement in this machine will become apparent to those skilled in this art from a consideration of the machine illustrated in the accompanying drawings, forming a part of this specification, which represents a desirable incorporation of the invention in a mechanism of practicable form.

In the drawings illustrating such preferred embodiment of the invention,—

Fig. 3 is a rear elevation of the appliance;

Fig. 4 is a plan view of the mechanism;

Fig. 5 is a vertical section on line 5—5 of Fig. 1, the parts being viewed in the direction indicated by the arrows, some of the parts being omitted and other parts indicated in full lines;

Fig. 6 is another vertical section on substantially line 5—5 of Fig. 1, with parts of the mechanism omitted and other parts shown which are not illustrated in Fig. 5;

Fig. 7 is a horizontal section on an enlarged scale, on line 7—7 of Fig. 8, these parts, constituting the blank-folding mechanism, being viewed in the direction indicated by the arrows;

Fig. 8 is a fragmentary, enlarged, vertical section on substantially line 5—5 of Fig. 1;

Fig. 9 is a vertical section on line 9—9 of Fig. 5;

Fig. 10 is a plan section on line 10—10 of Fig. 5;

Fig. 11 is a partial vertical section and partial elevation illustrating the paper-covering mechanism;

Fig. 12 is a section illustrating certain details of the paper-covering device;

Fig. 13 illustrates the mechanism for wrapping the finishing strip of paper on the box, and shows the advance end of the paper strip or tape applied to the box;

Fig. 14 is a similar view, illustrating the finishing-paper strip partly wound around the box;

Fig. 15 shows the paper strip completely wound around the box;

Fig. 16 is a section of the paper-folding mechanism, on line 16—16 of Fig. 10;

Fig. 17 is a section on line 17—17 of Fig. 10;

Figs. 18, 19 and 20 illustrate in plan various steps in the paper-folding operations;

Figs. 21, 22, 23, 24 and 25 show details of the folding mechanism;

Fig. 26 is a vertical section illustrating the means for folding the edge of the paper into the interior of the box;

Fig. 27 shows one of the supports for the upper table or hollow block;

Fig. 28 illustrates in perspective the folded blank carrier or conveyer;

Fig. 29 illustrates in perspective the arm-rocking mechanism for pushing the blanks downwardly into position before the blank-folding operation; and Figs. 30 to 37, inclusive, illustrate the steps in folding the blank and covering it with its finishing paper.

Figure 1:
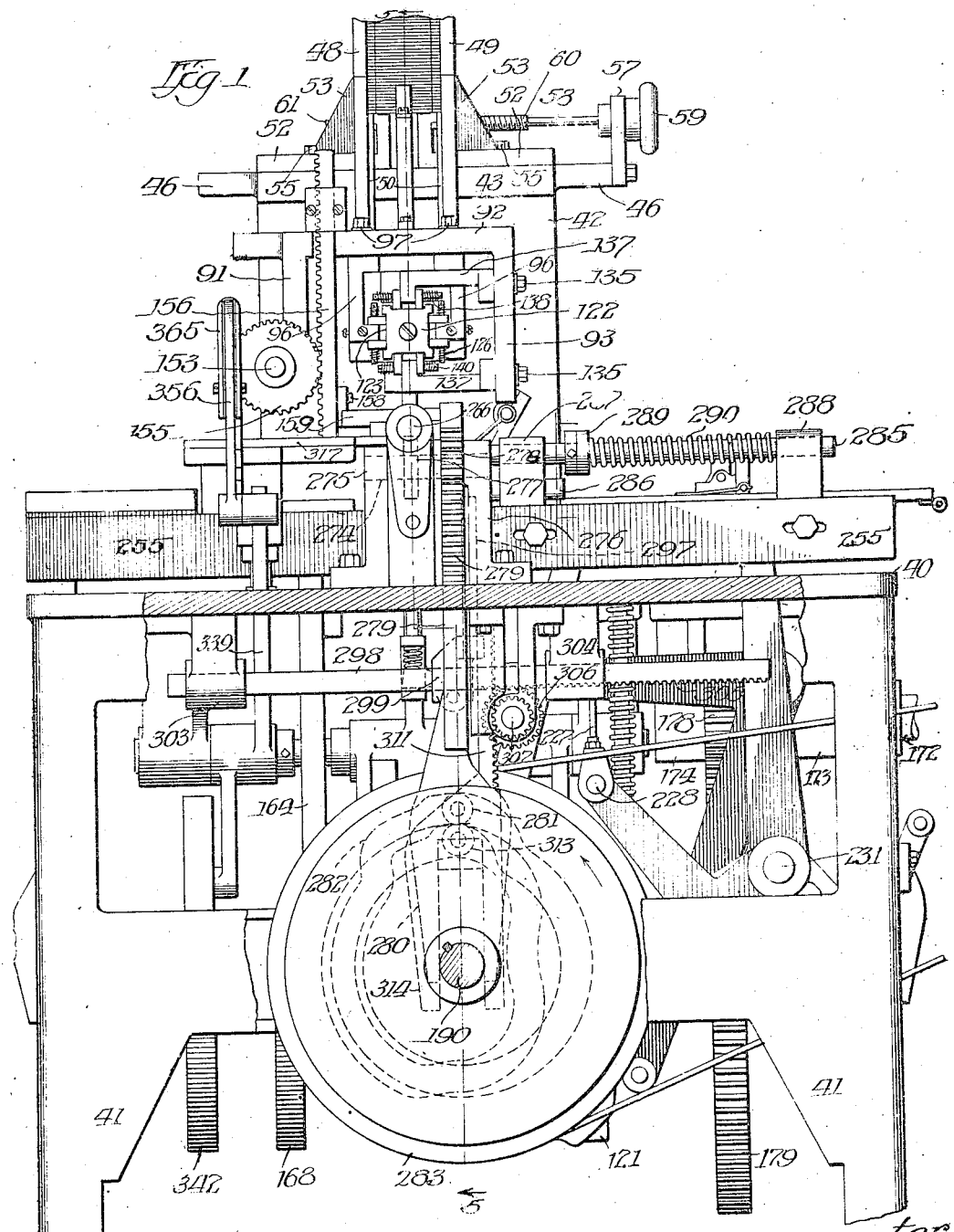
Figure 1 is a fragmentary front elevation of the machine, with parts broken away to more clearly illustrate the construction.

The machine is designed to individually feed pasteboard or similar blanks 35, with the corners cut out, as shown in Fig. 30, and then bend over the four edge portions 36 of the blank to form a box element or tray, as indicated in Fig. 31. The side walls of this box or box element are then wrapped around or covered with a finishing paper strip 37, the opposite edges of which protrude beyond the edges of the box and the side walls, as shown in Fig. 32. Then the two opposite marginal portions of such adhesive-coated covering-strip are folded down onto the head of the box and over the edges of two of the side walls, as illustrated in Fig. 33. Afterward, the remaining two opposite edge portions of the strip are folded over onto the box-head and over the edges of the other two box-walls, as shown in Figs. 34, 35 and 36. Then the bent portions of the paper are folded down into the box and caused to adhere to the inner surfaces of its side walls, as illustrated in Fig. 37.

Referring to Figs. 1, 2, 3 and 4, it will be observed that the machine has a table-top 40 supported on suitable cross-connected legs 41. Secured to the top of this table near the rear thereof, by means of bolts, there is a standard 42 (Figs. 1, 2, 3, 4, 5 and 6) having at its top a forwardly-projecting shelf 43 strengthened by a bracket 44 (Figs. 2 and 5) cast integral with the standard and shelf, the standard in turn being braced by a web 45 (Figs. 2, 3, 4 and 6). At its front portion, this ledge or shelf 43 is widened at 46, 46 (Figs. 1, 2, 3 and 4), such wider section having a groove 47 in its top face (Figs. 4 and 5).

Figure 2:
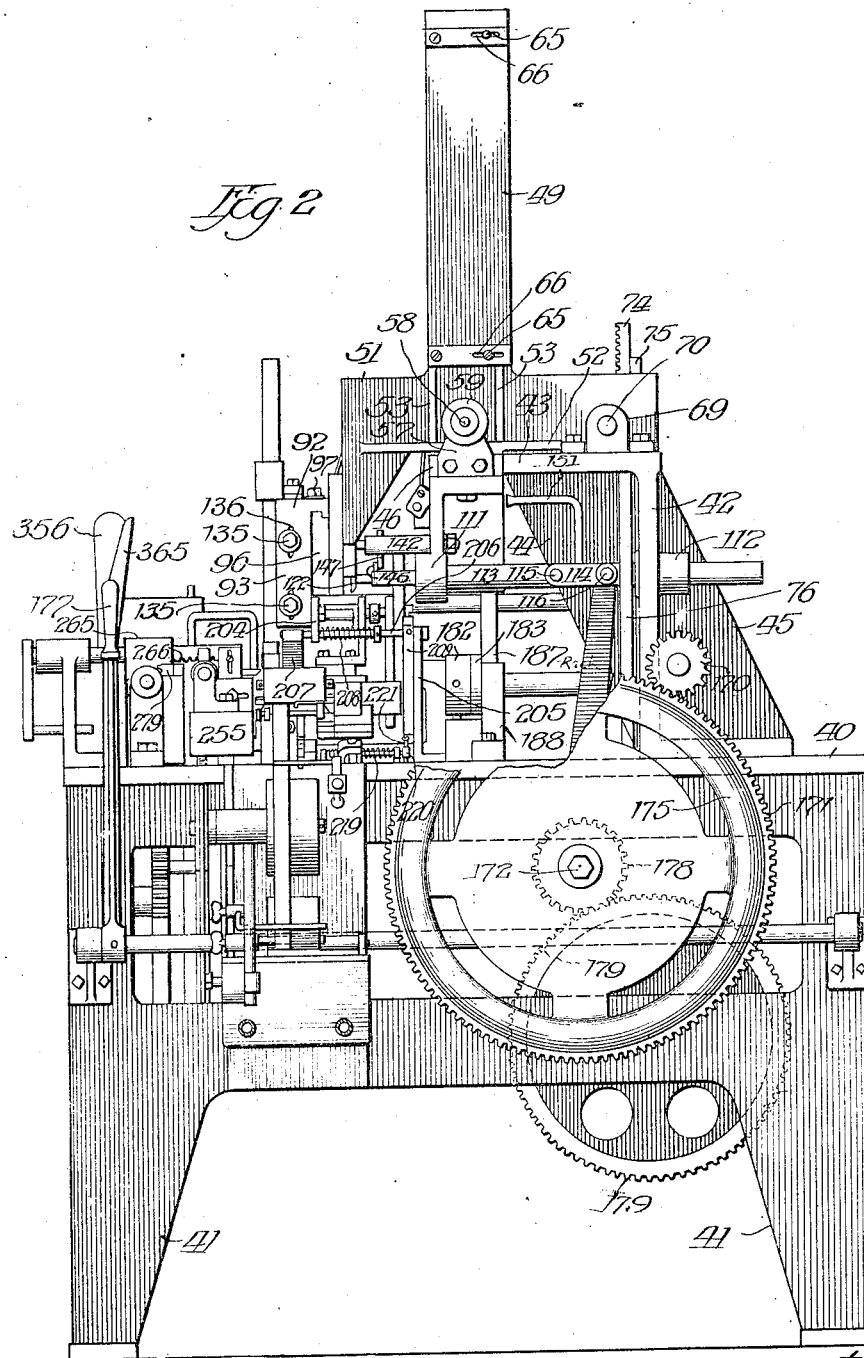
Fig. 2 is an end elevation of the righthand end of the machine, with certain parts broken away and other elements omitted.

The magazine for the pasteboard or cardboard blanks is composed of two upright walls 48 and 49 (Figs. 1, 2, 3, 4, 5, 6, 9), each having on its inner surface a pair of vertical ribs 50, 50 (Fig. 4) adapted to hold the blanks against displacement. Each of these walls has an enlarged or widened lower end 51 (Figs. 3, 4, 5 and 6) of the shape illustrated, and each plate is also supplied with an integral, outstanding, horizontal foot 52 strengthened by integral brackets 53, 53 (Figs. 1, 2 and 4). The lower face of each of these feet has a lug or rib 54 (Fig. 5) fitting and adjustable in the groove 47. Each of the feet 52 is secured to the ledge or shelf 43 by means of a pair of machine screws 55, 55 (Fig. 4), taking into threaded holes of the ledge and accommodated in slots 56, 56 of the foot.

As the machine is viewed in Fig. 4, the right-hand end of the shelf enlargement 46 has fastened thereto an upstanding bearing 57 revolubly receiving a shaft or rod 58 provided on its protruding end with a turning handle 59 (Figs. 1, 2 and 4). Such rod has right and left hand threaded parts 60, 61 (Fig. 4), which coöperate with similarly threaded collars 62, 63 secured, respectively, to the members 49 and 48. The hub of the handle 59 coöperates with one face of the bearing 57, and a collar 64 fastened to the rod coöperates with the opposite face of the bearing to prevent longitudinal or axial movement of the rod. Obviously, if the screws 55 of the two blank magazine members or walls 48 and 49 are loosened, and the handle 59 is turned so as to rotate the screw-threaded shaft, the magazine may be enlarged or contracted with facility without displacing the position of the magazine as a whole.

In order to permit such blank magazine to accommodate blanks of different sizes, the rear guide bars 50, 50 of the two plates 48 and 49 are fastened to their respective plates by means of screws 65 (Fig. 2) passing through horizontal slots 66 in the plates. It will be readily understood that this construction permits adjustment of the rear vertical bars 50 relatively to the front companion guide-bars 50.

Each of the vertical walls 48 and 49 has fastened to the lower end of its inner face a recessed block 67 (Figs. 5 and 6), on the upper edges of which the stack of pasteboard blanks in the magazine is adapted to rest. Each part 51 also has fastened to its inner face an inclined, bent guide 68 (Figs. 5 and 6), down the top surfaces of the pair of which the blanks are adapted to individually slide, as they are fed out one by one from the bottom of the magazine.

The means for discharging the lowermost blanks in the magazine one by one comprises a pair of bearings 69, 69 (Fig. 4), fastened to the top of the shelf 43, and revolubly receiving a shaft 70 equipped with a central gear 71, and two larger, wide gears 72, 73, fixed to the shaft at opposite sides thereof. Gear 71 and the shaft to which it is fastened are oscillated by means of a vertically-reciprocating rack 74 (Figs. 2, 4 and 6) guided at its upper end by a bearing 75, and having its teeth in mesh with those of the pinion 71. This rack is formed on the upper end of a vertically-sliding bar 76 (Fig. 6), slotted at 77, and extending through an aperture 78 in the shelf and a suitable hole in the table-top, the lower end of such bar being bifurcated at 79 to straddle the horizontal drive shaft 80 equipped with a cam 81 having in its side face a cam-groove 82, in which fits a roller 83 on the bar 76, it being obvious that the rotation of shaft 80 brings about the vertical reciprocation of the rack 74, with the resulting oscillation of shaft 70. Each of the walls 51 has secured to its inner surface a grooved block 84 (Figs. 4 and 6) forming a sliding bearing for a rack 85 having downwardly-presented teeth in mesh with one or the other of the gears 72 or 73, as the case may be. The forward end of each of these racks is not supplied with teeth, and projects through the aperture of the corresponding block 67. Each of these racks or bars has a beveled front end 86 (Figs. 5 and 6) provided with a forwardly-extending, downwardly-deflected finger 87. In addition, each of these bars or racks has a shoulder 88 of substantially the thickness of one of the blanks and adapted to engage the rear edge of the blank to force it outwardly.

To the bottom of shelf 43, a block 89 is fastened (Figs. 5 and 6), to the depending wall 90 of which a bracket 91 is secured (Figs. 1 and 5), the front end of which has a horizontal plate portion 92 (Figs. 1, 4 and 6), the end of which has a down-turned extension 93 (Figs. 1 and 2). On its under surface, the part 92 has a groove 94 (Fig. 6) in which are adjustably fitted the lugs 95 of a pair of brackets 96 held in place by screws 97, 97 (Figs. 1, 2, 4, 7 and 8) extending upwardly through slots 98, 98 (Fig. 4) in the plate 92. Each of such blocks has an upstanding bar 99 (Figs. 6, 7 and 8) secured to its inner face, providing a narrow passage 100 (Fig. 6) between itself and the vertical terminal portion 101 (Fig. 6) of the adjacent guide bar 68. A curved guide 102 is adjustably secured at 103 to the top of bracket 92, the upper end of the member 102 having a bent extension 104 adjacent to the lower end of the blank magazine.

On the table 40, a casting 105 (Fig. 6) is fastened by any suitable means, such casting having a pair of alined bearings 106 and 107, to the top of the former of which there is secured, by means of screws, a standard 108, the vertical slotted arm of which adjustably accommodates a screw 109 fastening to the bracket a horizontal gage or support 110, on which the lower edge of the descending pasteboard blank is adapted to rest in proper position preliminary to being forced through the die to be described.

A bearing 111 (Fig. 6) forming a part of the member 89, and a registering bearing 112 in the standard 42, slidingly receive a shaft 113 having a link 114 pivoted at 115, the opposite end of the link being pivotally associated at 116 to an arm 117 of a bell-crank-lever fulcrumed beneath the table at 118, the other arm of the bell-crank 119 having a roller 120 traveling in the cam groove of cam 121 on shaft 80. The forward end of shaft 113 is reduced in cross section, and carries a pusher 122 of the shape shown in Fig. 1, such rectangular plunger having its sides recessed at 123.

The rear edge of each of the vertical bars 99, as shown in Figs. 6, 7, and 8, is beveled at its lower portion at 124. Each block 96 (Figs. 7 and 8) has an inward projection or shelf 125 fixedly carrying a pin 126 extending both above and below the part 125. A pair of benders 127, 127 are rockingly mounted on each of such pins, with one above the part 125 and the other below it, as is clearly illustrated. Each of such benders comprises two fingers 128 and 129 at slightly less than right angles to one another. The normal positions of these four horizontal benders are shown in Fig. 7, in which positions the benders are yieldingly retained, and to which they are automatically returned when rocked or displaced, by means of springs 130, one for each bender, one end of each of such springs being connected to the bender, and the other end to the stationary pin or shaft 126 which it encircles. Each of the bars 96 has fastened thereto, by a screw 131, a right-angled guide 132 (Fig. 7), of which the inner face 133 of one of the legs 134 is in alinement with the inner faces of the parts 125 and 99, constituting guiding extensions thereof.

As is illustrated in Figs. 1, 2 and 8, the downward extension 93 has adjustably secured thereto, by means of screws 135 and slots 136 in the part 93, a pair of bars 137, 137, equipped on their inner faces with beveled die blocks 138, 138. Each of the bars 137 has a projection 139 supplied with a horizontal fixed pin or shaft 140 having, on opposite sides of the part 139, spring-pressed benders 141 substantially like the benders 127.

Referring to Fig. 6, it will be apparent that on the support 89, above the bearing 111, another slotted bearing 142 is provided, in which slides a shaft or rod 143 equipped with a flat head 144 adapted temporarily to receive on its top surface the lower edge of the blank as it descends in the registering passages 100, 100, in which its vertical edge portions are accommodated. This shaft or rod 143 is pressed outwardly by a spring 145 accommodated in the bearing 142, and the shaft is intermittently retracted by the coöperation of a finger 146 on shaft 113, with a pin 147 extended through the shaft 143 and received in the slots of the bearing, such pin also acting to prevent rotation of the shaft in the bearing, as will be obvious.

In order to positively push the blanks down the chute onto the head 144, the mechanism is equipped with a suitably mounted, spring-rocked shaft 148 (Figs. 6 and 29) carrying a pair of arms 149, in which is rockingly mounted a pair of spring-retracted, spaced fingers 150. To rock such fingers and shaft downwardly, the sliding shaft 113 is provided with a bent rod 151 (Fig. 6) adapted to engage the arms 149 and turn the fingers downwardly against their spring-retracting influence, such fingers then straddling the guide 102.

The standard 42 (Fig. 3) has a bearing 152 for a shaft 153 (Figs. 1, 3 and 5), the front end of which is revoluble in a bearing 154 (Fig. 5) in the bracket 91. The forward end of such shaft has a gear 155 (Fig. 1), the teeth of which are in coöperative relation with a vertically-reciprocating rack 156. This rack-bar has a folded-pasteboard-blank carrier adjustably fastened thereto, comprising a slotted bar 157 (Figs. 1 and 28) secured to the rack-bar by a screw 158 extended through the slot, the bar 157 having a lateral extension 159 equipped with slots 160, 160 receiving screws 161, 161, which adjustably fasten to the under side of the bar 159 a pair of spaced, rigid, carrier arms or fingers 162, 162.

Shaft 153, near its rear end, has a pinion 163 (Fig. 5) thereon, which meshes with the teeth of the vertically-sliding rack 164, the lower end of which is bifurcated at 165 to accommodate shaft 80, the rack-bar also having a roller 166 received in the cam-groove 167 of cam 168 on shaft 80.

The machine is desirably operated by means of an electric motor 169 (Figs. 3 and 4) mounted on the top of table 40 and communicating its rotary motion, by means of an intermeshing pinion 170 (Fig. 2) and gear 171, to a shaft 172 (Figs. 2, 3 and 4) revoluble in bearings 173 and 174 (Fig. 3) bolted to the under side of the table-top. This shaft is also conveniently supplied with a hand-wheel 175 (Figs. 2, 3 and 4) and a clutch mechanism 176 between gear 171 and the shaft, the clutch being operated by a handle or lever 177, shown in Figs. 2 and 4. The rotation of shaft 172 is transmitted to the main drive shaft 80, revoluble in suitable bearings by means of an intermeshing pinion 178 (Fig. 3) on shaft 172, and gear 179 on drive shaft 80.

The above-described parts of the machine constitute the mechanism for feeding, folding and conveying the pasteboard blanks, which elements of the machine operate substantially as follows:

Assuming that the magazine 48, 49 is filled with a stack of blanks of the shape illustrated in Fig. 30, and that such blanks are prevented from becoming displaced in the magazine by the vertical guide-bars 50, 50 fitting in the cut-out corners of the blanks, it will be clear that as the shoulders 88 of the pair of rack-bars 85 in their forward travel engage the rear edge of the lowermost blank resting on the bars 67, they will strike such blank, pushing it out forwardly. The cam-groove $c^e$ cam 81 is so shaped that the rack-bars 85 will advance about half way under the magazine, will then recede slightly, and then advance fully, the purpose of this construction being that, if the shoulders 88 lose their hold on the first advance movement on the blank, they secure another hold on the second advance movement, which completes their forward stroke. As soon as the discharged blank is freed from the weight of the pile of blanks above it, it falls forwardly into vertical position, possibly, but not necessarily, striking the guide 102, with its lower edge resting on the head 144 of shaft 143, which at that time is sufficiently forwardly projected by its spring 145 to receive the blank, which it holds in position for a short time. This turning of the blank from horizontal to vertical position is facilitated and aided by the presence of the guides 68, 87, 104 and 102. At about this time the arm 151, in its forward travel, engages the parts 149 and rocks the fingers 150 downwardly, which strike the upper edge of the blank and insure that the blank will fully descend on the head 144, although under ordinary circumstances the blank falls by its own weight into the proper position.

When the shaft 113 recedes, its lug 146 engages the pin 147, drawing back shaft 143 and its flat head 144, permitting the blank to fall until its lower edge engages the stop or support 110. Such retraction of the shaft also removes the fingers 150 from the influence of arm 151, so that these fingers, under the action of the springs operating upon them, swing quickly back into the inoperative position illustrated in Fig. 6.

The pair of vertical, beveled bars or blocks 99 constitute two side members of a rectangular die, of which the pair of beveled, horizontal bars or blocks 138 comprise the other members. During the next forward stroke of the pusher or plunger 122, the blank resting on the bar 110 is forced between the die blocks 99 and 138, bending over all four marginal portions 36 of the blank 35 to form the sides of the box or box-element, as illustrated in Fig. 31. After the blank has passed the die members 99, which bend over the vertical side portions, and before it has reached the companion die members 138, it engages the four horizontal fingers 128 of the two pairs of benders, and as the blank and the pusher advance, they rock these benders on their pins 126 against the action of their springs 130, causing the fingers 129 of the benders to fold the vertical sides of the blank inwardly beyond a right angle, which folding or bending operation is permissible by reason of the thinness of the pusher and its beveled rear face, the edges of the pusher being comparatively thin and sharp, as shown, for example, in Figs. 7 and 8. After passing the die blocks 138, the other or two horizontal sides of the box are operated upon in like manner by the other pairs of vertical benders 141.

The object of bending these sides of the box inwardly beyond the right-angle position is to secure an effective bending of these portions, as they will naturally spring outwardly again to some extent. While the blank is being forced between the die members 138 and is being operated upon by the benders 141, the previously bent sides of the box are prevented from spreading by reason of the presence and position of the guiding surfaces 133. By the time the box reaches the ends of the guides 133, 133, the vertically-sliding carrier will be stationary in its uppermost position, in register with the blank or box. Continued forward movement of the pusher forces the box into the carrier between the vertical bars 162, 162, from which it does not escape by reason of the friction which its sides exert on the bars 162, such box-sides, of course, retaining some tendency to expand. This carrier is then ready to descend, to convey the box into position to be transferred to the form on which it receives its covering paper. During the retraction of the pusher 122, there is no interference with the benders because of the cut-out portions 123 in the sides of the pusher, which permit the pusher to pass by the benders without conflict.

Bearings 106 and 107 (Fig. 5) described above, revolubly accommodate a hollow shaft 180, which has a hollow, rectangular form or core 181 detachably fastened to its front end. This shaft has a ratchet mechanism, of which one part 182 rotates with the shaft, the companion element 183 being oscillatingly mounted on a cylindrical rod 184 accommodated within the shaft 180. The member 183 is held in position,—that is, in coöperative relation with its companion element 182—by a collar 185, and it also has a pinion 186 in mesh with a rack 187 vertically slidable through an aperture in the table-top and guided by a bearing 188 (Fig. 2). The lower end of this rack-bar is bifurcated at 189 (Fig. 9) to straddle the drive shaft 190 located beneath the table and extending from the front toward the rear of the machine at right angles to the shaft 80, from which it is driven by the coacting beveled gears 191 and 192 (Fig. 5). Such rack-bar 187 has a cam-roller 193 (Fig. 9) coöperating with a cam-groove 194 in cam 195 fixed on shaft 190.

Clutch member 182 is adapted to be held fixedly temporarily against rotation by means of a vertically slidable lock 600, (Figs. 5 and 9) fulcrumed at 602 and equipped with a roller 603 traveling on the peripheral cam edge of cam 195. When the time arrives for form 181 to revolve, the lock 600 is, for the time being, automatically withdrawn from the hole in part 182 in which it fits, permitting such rotation.

The rod 184 has a head 196 (Figs. 5 and 10) which may be retracted within the cavity 197 of the rectangular form or core 181. A collar 198 (Fig. 5) is pinned to this rod 184, and between it and a part of the hollow shaft 180, a coiled expansion spring 199 is accommodated within the shaft, such spring acting, as will be readily understood, to retract the rod and draw its head within the form.

A bell-crank-lever rockingly mounted at 200 (Fig. 5) beneath the table-top, has one arm 201 coacting with the end of the rod 184, its other arm 202 having a cam-roller 203 riding on the exterior, irregular surface of cam 81. Obviously, the rotation of the cam through the action of the bell-crank causes the forward movement of the rod, its retraction being occasioned by the action of spring 199.

In a bearing 204 (Fig. 2) secured to the back face of the supporting arm 93, and in a bearing 205, a shaft 206 is rockingly mounted, the front end of such shaft having a downwardly-extended, bent, wiper-arm 207 (see also Figs. 11, 13 and 15), the lower, curved end of which is in proximity to the form 181. This shaft is encircled by a spring 208 (Fig. 2) tending to rock the arm 207 toward the form, the shaft having also fixed thereto a depending arm 209 (Figs. 2 and 11), the lower end of which extends into the path of travel of the arms of a star wheel 210 (Figs. 5 and 11) mounted on the hollow form-shaft 180. Other spring-rotated shafts 211, 212 (Fig. 11) are supported in suitable bearings, such shafts having at their forward ends bent wiper arms 213, 214, and at their rear ends operating arms 215, 216, respectively, located in the plane of the star wheel 210. A bent-wire arm 217 (Fig. 11) is rockingly mounted in bearings 218, and the part between the bearings is surrounded by an actuating spring 219 (Fig. 2), the shaft having a projection 220 provided with a stop screw 221 adapted to limit the turning of the shaft and the movement of the arm.

An arm or lever 222 (Fig. 13) is fulcrumed at one end in suitable bearings at 223, and near its opposite end carries a bearing member or block 224 in which a flat-faced presser 225 is rockingly mounted, such presser being operated upon by a coiled expansion spring 226 interposed between it and the base of the block 224. As is indicated in Fig. 11, this bearing member is adjustable lengthwise of the lever 222 by means of its screw and slot connection. A headed rod 227 (Fig. 12) extends through an aperture of the lever and is pivoted at 228 to a projection 229 of a cam-lever 230 fulcrumed on the frame of the machine below the table-top at 231, this lever carrying at its end a cam roller 232 coacting with a cam 233 on shaft 190. The lever 222 has another aperture, through which the end of a shouldered rod 234 projects, such rod being surrounded by a sleeve 235, encircling which is a coiled spring 236, bearing at its top end against an enlargement or shoulder 237 of the sleeve, and pressing at its lower end against an adjustable nut 238 (Fig. 12) on the rod 234, the lower end of the latter being pivoted at 239 to an arm 240 of a lever 241, also fulcrumed at 231, and having a cam-roller 242 received in a cam-groove 243 of cam 233.

The machine also includes a finishing-paper strip glue coating means (which need not be described) operated by a belt 245 (Fig. 3), which passes around a grooved pulley 246 (Fig. 5) on shaft 190. The adhesive-paper-strip feeding mechanism comprises a slide 247 (Fig. 11) connected by an adjustable screw-threaded link 248 to a rock lever 249 fulcrumed at 231 on the machine frame, and having on its lower end a roller 250 traveling in the cam-groove 251 of a cam 252 on shaft 190. This slide carries a spring presser-arm 253, which holds the paper down near the front end of the slide, and it also carries a pair of spring-pressed dogs 254 riding on the top of the paper-strip and acting to prevent retraction of the latter, but permitting its free forward travel, as is usual in constructions of this character. This paper-feeding slide, as well as several other parts of the mechanism, are mounted on a bar or upper table 255 (Figs. 1, 2, 4, 5, 6, 10 and 26) extended across and above the top of the table. Although it need not here be described, this paper-feeding mechanism is adjustable to accommodate finishing strips of different widths. The supplemental or upper table 255 is also vertically adjustable, and is mounted on a pair of upright rods 500 (Fig. 26), the lower ends of which are adjustably received in split clamps 501 mounted on the frame of the table. The exact adjustment of this upper table is facilitated by the employment of a suitable number of screws 502 (Fig. 26) having threaded engagement with the upper table or block, and bearing at their lower ends on the upper surface of the table-top 40. An arm 256 (Fig. 13) carrying a knife-blade 257, which coöperates with the end 258 of the support to form a pair of shears for the cutting of the paper-strip, is fulcrumed at 259 on the upper table, and is operated, as is shown in Fig. 11, by a bar 260 adjustable as to length, and having a roller 261 received in the groove 262 of a cam 263 on shaft 190, the lower end of the bar 260 being slotted at 264 to straddle the shaft and guide its lower end.

At the front of the machine, a supporting block 265 (Fig. 5) is mounted, which slidingly receives and guides a rack-bar 266 carrying a lower, hollow, end portion 267 (Figs. 5 and 18), the cylindrical cavity of which accommodates a sleeve 268 provided with a pin 269 traveling in a slot of the part 267, a coiled spring 270 being interposed between the sleeve 268 and the end wall 271. This sleeve is limited in its outward projection by means of a screw 272 passing through an aperture in the plate 271 and taking into a threaded opening in the sleeve. The other end of the sleeve or plunger revolvingly accommodates a head 273 adapted to yieldingly hold the blank against the form 181 and revolve therewith. A shaft 274 (Fig. 5) revolves in a pair of bearings 275 and 276 (Fig. 1), and has a gear 277 in mesh with the horizontal rack-bar 266, and a second gear 278 in mesh with a vertical, sliding rack 279 (Fig. 5) bifurcated at its lower end at 280 (Fig. 1) to accommodate shaft 190, and supplied with a cam-roller 281 received in the cam-groove 282 of cam 283 on shaft 190. It should be apparent therefore that the rotation of shaft 190 by these parts causes the reciprocation of rack 266 and the elements carried thereby.

The operation of the paper-covering mechanism occurs practically as follows:

As the folded-blank carrier or transporter 162, 162 approaches the lower end of its stroke, the blank held therein engages the top face of the block or member 255, so that the continued descent of the carrier causes the temporarily-arrested, folded blank to engage the shoulders 162ᵃ of the carrier, at which time such blank will be in alinement or register with the form. The plunger 196 then advances to engage the inner face of the box-head. Then the rack 266 advances, bringing the holder 273 into engagement with the outer face of the box-head. At this time the three arms 207, 213 and 214 are held out of coöperative relation with the form by reason of the teeth or arms of the star wheel 210 engaging the arms 209, 215 and 216 (Fig. 11). At this moment also, the presser 225 is in its lowered position, as shown in Fig. 11. The folded blank is then extracted from the carrier and applied to the form by reason of the simultaneous rearward movement of the two coöperating parts 196 and 273, which hold the blank between them. As soon as the blank is removed from the carrier, the latter immediately begins its ascent for the reception of another blank. During the descent of the carrier, the paper-feeding slide 247 had been advancing, and, during the application of the bent blank to the form, had positioned the forward end of the paper-strip, already coated with adhesive, between the blank and the presser 225.

After the blank has thus been applied to the form, the presser rises, carrying this projected, front end of the adhesive paper-strip into contact with that side of the box at the bottom of the form, which is prevented from expanding owing to the action of the spring-pressed arm 217. Then the form and its shaft begin their rotation, and at once the spring-pressed arms 207, 213 and 214 are freed by the movement of the star wheel to engage the corresponding sides of the box to prevent their expansion or outward bending.

During a single revolution of the form with a blank thereon, it draws forward the strip of glue-coated paper, and the same is caused to adhere to the box-sides by reason of the strain under which the paper is put, and also by reason of the action of the arms 217, 213 and 214, which press the paper into firm contact with the walls of the box, this action being assisted by the pressing function of the member 225, which, by reason of its pivotal mounting, can swing to contact flatly with the various sides of the box as they are presented to it, and thereby cause a pressing and wiping action on the paper. Stated differently, this presser, by reason of its peculiar mounting, automatically conforms to the side of the box and travels along it, smoothing the paper applied thereto.

When the form has completed one revolution, the arms 207, 213, and 214 are again retracted by the star wheel, and the paper-covered box, with the marginal portions of the paper protruding beyond the edges of all sides of the box, is removed from the form by the simultaneous forward travel of the two parts 196 and 273, between which it is held. The box is then ready to have the protruding sections of the sticky paper folded down onto the head, and down into the box against the inner faces of its sides. In this paper-covering operation, the strip of glue-coated paper is, of course, severed from the stock strip by the coaction of the parts 257 and 258, so as to provide a strip of the proper length.

In passing, it should be noted that in order to cause the forward end of the paper to adhere to the box, the arm 222 and the presser 225 which it carries are positively pushed upwardly by the engagement of the shoulder on rod 234 with the under side of the arm, as illustrated in Fig. 13. Then the rod descends, as indicated, for example, in Fig. 14, leaving the arm under the upward pressing action of spring 236, so that it can yield to permit the presser to conform to the box as it revolves. After the covering operation is completed, the presser is positively pulled down by the headed rod 227 against the expanding action of spring 236.

A block 284 (Figs. 4, 10, 18, 19, 20 and 23) is secured to the end of the longer shaft 285 and to the end of a shorter shaft 286, the former being adapted to slide in bearings 287 and 288 secured to the top of the support or upper table 255, the companion shaft 286 sliding in an aperture of the bearing 287 only. Shaft 285 has a collar 289 fastened thereto, a coiled spring 290 surrounding the shaft between such collar and the bearing 288. This slidable support 284 has vertically adjustably fastened thereto a pair of folding fingers 291 and 292 (Figs. 23 and 25), disposed one above the other. It also has another pair of vertically-adjustable fingers 293 and 294 spaced away from the companion fingers 291 and 292 an amount corresponding to the height of the side of the box,—that is, the dimension of the box from its bottom to its top edge. By slot and screw connections or in any other approved manner these fingers 293 and 294 are vertically adjustable on the intermediate block 295, which in turn is horizontally adjustable on the part 284 by means of screw 284ᵃ and slot 284ᵇ.

The hollow, supporting block or supplemental table 255 has a longitudinal slot 296 (Figs. 10, 18, 19 and 20), through which upwardly extends a finger 297, the lower end of which is slidingly mounted on a shaft 298 (Fig. 1) by means of a split clamp 299 which permits longitudinal adjustment of the arm on the shaft for operation on boxes of different size. Shaft 298 slides in bearings 303 and 304 (Fig. 1), and has on its under surface rack teeth 305 (Figs. 1 and 5) meshing with those of a gear 306 on a short shaft 307 revoluble in bearings 308, 309 (Fig. 5) depending from the under surface of the table-top. This shaft 307 receives its oscillatory movement by reason of a pinion 310 in mesh with a vertical rack 311 reciprocated by a cam 312 on shaft 190, in whose cam-slot a roller 313 on the lower end of the rack-bar is received, such end of the rack-bar being slotted or bifurcated at 314 (Fig. 1) for the accommodation of shaft 190. On the support or upper table 255, and on opposite sides of the slot 296, there are positioned two spaced folders 315 and 316 (Figs. 10, 16, 17, 18, 19, 20 and 23), and above these, on the removable plate 317 (Figs. 16, 17, 21 and 23), there are mounted the companion pair of folder-fingers 318 and 319, the parts 315 and 316, and 318 and 319, being spaced away from one another a distance substantially equal to the depth of the box-walls. These various folders are mounted on and form extensions of other folders 320, 321, 322 and 323 (Figs. 17, 22 and 23), which are so shaped as to fold protruding portions of the finishing-paper strip over onto the bottom of the box and over its top edges as the box is pushed between the folders by means of the finger 297, as illustrated more clearly in Fig. 20.

The operation of this part of the appliance occurs substantially as follows:

The box 324, with the finishing or covering paper 37 wound thereon and adhering to its sides, such paper projecting beyond both edges of the box, is delivered into the position shown in Fig. 18 by the coöperating elements 196 and 273, between which it is gripped. During such travel of the box, the folding arms 291, 292, 293 and 294 are held back against the action of spring 290, in the position shown in Fig. 18, by the engagement of the lug 297 with the body portion of the arm 294. Then the feeding lug 297 advances toward the box, the four fingers 291, 292, 293, 294 following it under the expansion of spring 290. Such travel of the fingers, because they project beyond the feeder 297, folds the protruding paper edge portion 326 down onto the head of the box, and the opposite, marginal, protruding portion 327 over the edge of the box, as illustrated in Fig. 19, the travel of the member 284 and the parts which it carries being limited by the engagement of the collar 289 with the bearing 287.

The coöperating, holding plungers 196 and 273 quickly separate, and the finger 297, continuing its uninterrupted forward travel, pushes the box between the four folders 315, 316, 318 and 319, which turn the marginal portion 328 of the paper of the advance portion of the box over onto the head of the latter, and the marginal part 329 over the edge of the box (Fig. 20). Then as the finger 297 continues its travel, the four folders 320, 321, 322 and 323 bend over the upper and lower, horizontal, marginal parts 330 and 331 onto the head of the box, and the upper and lower portions 332 and 333 over the edge of the open mouth of the box. The finger delivers the partly-finished box in this condition, in the position shown in Fig. 10, at the upstanding wall or plate 334.

The machine also includes a pair of bearings 335 and 336 (Fig. 26) bolted to the top of the table, in which a hollow shaft 337 is slidable, such shaft at one end being connected by a link 338 to a bell-crank 339 fulcrumed at 118, the lower end of the elbow lever having a cam-roller 340 traveling in the irregular groove 341 of cam 342 secured on shaft 80. The cylindrical cavity in shaft 337 accommodates a rod 343, which at its front end has a cylindrical enlargement 344 (Fig. 10) with oppositely-extended projections or lugs 345. This rod has thereon a washer 346 adapted to bear against the face of bearing 335, being pressed by a spring 347, which at its other end bears against a removable or detachable, rectangular, form or plunger 348, with a cavity 349 of substantially the same shape as the lugged head of the rod. This construction permits this form or plunger to be placed on the rod and retained thereon by turning ninety degrees, and permits the form or plunger to be replaced easily by another of different size or shape. The plunger is, of course, of substantially the same size and shape as the interior of the box operated upon. To one side of this form a leaf spring 350 (Fig. 10) is fastened. In order to transmit the reciprocation of the hollow shaft 337 to the rod 343, they are pinned together at 351 (Fig. 26).

The actuation of this portion of the construction occurs approximately as follows:

While the feeding arm or finger 297 is moving rearwardly toward the part 284, shaft 337 and the contained rod 343 advance, causing the plunger 348 to enter the partially-completed box while it is in the position in which the finger 297 left it, as shown in Fig. 10, and, during such entrance, fold down all four parts 327, 329, 332 and 333 of the paper-strip into the interior of the box and cause them to adhere to the four inner surfaces of the box-sides. The plunger also presses the head of the box against the plate or abutment 334, bringing about a more efficient adhesion of those portions of the finishing paper which had been previously folded down onto the outer face of the box-head. During such movement of the plunger, the spring 347 comes into action, compensating for any irregularities or differences in the thickness of the cardboard and paper employed.

It should be observed, furthermore, that the relatively flat spring 350, during such advance of the plunger, squeezes between itself and the side face of the latter not only the advance vertical wall or side of the box which the form enters, but also the rearmost vertical side-wall of the next preceding box, in this way effecting an adequate adhesion of the paper against the inner surfaces of the box-sides. It will be readily understood that when the box which the plunger enters is advanced by the next oncoming box to its next position, its rear, vertical, side-wall, as well as the front, vertical, side-wall of such next box, will be squeezed between the spring and form-plunger.

To secure an adequate pressure on the upper and lower, horizontal, side-walls of the box, the following instrumentalities are employed:

The plate 317 mentioned above in connection with the folding devices, is equipped on its under surface with a bar or plate 352 (Fig. 26) adapted to bear on the tops of the boxes. This plate has a handle 353, is slotted at 354 for the accommodation of the abutment 334 (Fig. 4), and is held in place by dowel pins 355, 355. In order to press the plate 352 home against the traveling boxes, a handle 356 (Fig. 26) is fulcrumed at 357, and is provided with an apertured extension 358, through the hole of which a presser rod 359 passes, such rod having a collar 360 limiting its descent, and near its lower end having a collar 361, between which and the under face of the extension 358 a coiled, compression spring 362 is employed. A detent 363 is pivoted on the handle, and is adapted to coöperate with a notch in the member 364, the handle 356 having a supplemental detent-release handle 365 pivoted at 366. It should be clear from this construction that the rod 359 is spring-pressed down against the top of the plate 317, the latter being detachably held in position. In this way an adequate pressure is applied to the tops of the boxes.

The various operations of feeding the blanks, folding them, conveying them in the carrier, wrapping their sides with the covering paper, and folding the protruding edges of such paper, occur all substantially simultaneously on different boxes, but at different places in the machine, so that a number of boxes are being operated upon at one time, which, of course, greatly increases the capacity of the device.

A feature of the invention which should be noticed is the adjustability of the various structural elements of which the machine is composed, giving the latter the capability of forming and covering boxes of different sizes and shapes, the change from one to another being easily and relatively quickly accomplished.

From this description of the construction and operation of this particular embodiment of the invention, it will be apparent to those skilled in the art that many minor mechanical changes may be made in the machine and still retain the features of the invention. That is to say, such modifications may be incorporated in the mechanism without departing from the substance of the invention and without losing any of its substantial advantages.

I claim:

1. In a machine of the character described, the combination of a die, a plunger adapted to force a pasteboard blank through the die and bent over its edge portions, means to operate said plunger, a form, a carrier adapted to receive the bent blank after its passage through the die and convey it into proximity to the form, means to actuate said carrier, means to transfer the bent blank from the carrier to the form, and means to cover the bent blank with finishing material while on the form, substantially as described.

2. In a machine of the character described, the combination of a die, a plunger adapted to force a pasteboard blank through the die and bend over its marginal portions, means to operate said plunger, means to feed flat pasteboard blanks individually to said die and associated plunger, a form, a carrier adapted to receive the bent blank after its passage through the die and to convey it into proximity to the form, means to actuate said carrier, means to transfer the bent blank from the carrier to the form, and means to cover the bent blank with finishing material while on the form, substantially as described.

3. In a machine of the character described the combination of a die, a plunger adapted to force a pasteboard blank through the die and bend over its marginal portions to constitute the sides of the box element, means to operate said plunger, a form, a carrier adapted to receive the bent body after its passage through the die and to convey it into proximity to the form, means to actuate said carrier, means to transfer the bent body from the carrier to the form, means to revolve the form, and means to cover the bent body with a finishing material during the rotation of the form, substantially as described.

4. In a machine of the character described, the combination of a die, a plunger adapted to force a pasteboard blank through the die and bend over its marginal portions to constitute the sides of the box element, means to operate said plunger, a form, means to intermittently rotate the form, a carrier adapted to receive the bent body after its passage through the die and to convey it into proximity to the form, means to actuate said carrier, means to transfer the bent body from the carrier to the form while the latter is stationary, and means to cover the bent body with a finishing material during the rotation of the form, substantially as described.

5. In a machine of the character described, the combination of a die, a plunger adapted to force a pasteboard blank through the die and bend over its marginal portions, means to operate the plunger, a form, a carrier adapted to receive the bent blank after its passage through the die and convey it into proximity to the form, the bent blank being held in the carrier solely by the tendency of its sides to expand, means to actuate said carrier, means to transfer the bent blank from the carrier to the form, and means to cover the bent blank with a finishing material while on the form, substantially as described.

6. In a machine of the character described, the combination of a die, a reciprocatory plunger adapted to force a pasteboard blank through the die to bend over its marginal portions, means to reciprocate said plunger, a form, a carrier sliding at right angles to the direction of reciprocation of the plunger and adapted to receive the bent blank after its passage through the die and to convey it into register with the form, means to transfer the bent blank from the carrier to the form, and means to cover the bent blank with a finishing material while on the form, substantially as described.

7. In a machine of the character described, the combination of a die, means to force a pasteboard blank through the die to bend over its marginal portions, a form, means to transport the bent blank from the die to the form, and means to cover the bent blank with finishing material while on the form, substantially as described.

8. In a machine of the character described, the combination of a die, means to force a pasteboard blank through the die to bend over its marginal portions, a form, means to intermittently revolve the form, means to transport the folded blank from the die and apply it to the form while the latter is stationary, and means to cover the bent blank with a finishing material during its rotation on the form, substantially as described.

9. In a machine of the character described, the combination of a die, means to force a pasteboard blank through the die to bend over its marginal portions, a form, means to revolve the form, means to transport the folded blank from the die and apply it to the form, means to cover the bent blank with finishing material while revolving on the form, and means to prevent the sides of the blank from expanding while it is on the form, substantially as described.

10. In a machine of the character described, the combination of a die, a plunger adapted to force a pasteboard blank through the die to bend over its edge portions, a form, means to intermittently revolve the form, a carrier adapted to receive the bent blank after its passage through the die and to convey it into register with the form, means to transfer the bent blank from the carrier to the form while the latter is stationary, means to cover the bent blank with finishing material while it is revolved on the form, means to prevent the sides of the blank from expanding while on the form, and means to expand such latter means during the application of the blank to the form, substantially as described.

11. In a machine of the character described, the combination of a die, means to force a pasteboard blank through the die to bend over its marginal portions to constitute the sides of the box element, a form, a carrier adapted to receive the bent blank after its passage through the die and to convey it into register with the form, a plunger adapted to transfer the bent blank from the carrier to the form, and means to cover the bent blank with a finishing material while on the form, said transfer plunger holding the blank to the form during the application of such finishing material, substantially as described.

12. In a machine of the character described, the combination of a die, means to force a pasteboard blank through the die to bend over its marginal portions to constitute the sides of the box element, a form, a carrier adapted to receive the bent body after its passage through the die and to convey it into register with the form, a reciprocatory rotatable plunger to transfer the bent body from the carrier to the form, means to revolve the form, and means to cover the bent body with a finishing material during its rotation on the form, said transfer plunger holding the body to the form and revolving therewith during its revolution, substantially as described.

13. In a machine of the character described, the combination of a die, means to force a pasteboard blank through the die to bend over its marginal portions to constitute the sides of the box element, a form, a carrier adapted to receive the bent body after its passage through the die and to convey it into register with the form, means to actuate said carrier, a pair of coöperating plungers adapted to engage the blank between them and to transfer the blank from the carrier to the form, means to operate said plungers, means to revolve the form, and means to cover the bent body with a finishing material during the rotation of the form, substantially as described.

14. In a machine of the character described, the combination of a die, means to force a pasteboard blank through the die to bend over its marginal portions to constitute the sides of the box element, a form, a carrier adapted to receive the bent body after its passage through the die and to convey it into register with the form, means to actuate said carrier, means to revolve the form, means to cover the bent body with a finishing material during its rotation on the form, a pair of coöperating plungers adapted to engage the head of the box between them, to transfer the box-blank from the carrier to the form, to hold it to the form during its rotation, and to deliver it from the form after it has been covered with the finishing material, and means to operate said plungers, substantially as described.

15. In a machine of the character described, the combination of means to bend over the marginal portions of a pasteboard blank to constitute the sides of a box, a form, means to transfer the bent blank from said bending means and place it on the form, means to supply a finishing paper strip to the sides of the box while on the form with portions of the strip extending beyond both edges of the sides, means to discharge the papered box from the form, and means to fold the opposite protruding edges of the paper strip down onto the face of the box-head and also against the inner faces of the box-sides after the box has left the form, substantially as described.

16. In a machine of the character described, the combination of a die, means to force a pasteboard blank through the die to bend over its marginal portions to form the side walls of a box, positively acting means to still further bend an opposite pair of said marginal portions of the blank substantially uniformly throughout their length beyond a right angle to the body of the blank, and other subsequently operating positively acting means to still further bend the remaining opposite pair of marginal portions of the blank substantially uniformly throughout their length beyond a right angle to the body of the blank, substantially as described.

17. In a machine of the character described, the combination of a die, means to force a pasteboard blank through the die to bend over its marginal portions to form the side walls of the box, and means projecting into the path of travel of the blank and acting to still further bend such marginal portions of the blank beyond a right-angle to the body of the blank, substantially as described.

18. In a machine of the character described, the combination of a die, means to force a pasteboard blank through the die to bend over its marginal portions to form the side walls of the box, rocking fingers adapted to still further bend such marginal portions of the blank beyond a right-angle to the body of the blank, and means projecting into the path of travel of the blank to rock such bending fingers, substantially as described.

19. In a machine of the character described, the combination of a die, means to force a pasteboard blank through the die to bend over its marginal portions to form the side walls of the box, spring-retracted rocking fingers adapted to still further bend such side portions of the blank beyond a right-angle to the body of the blank, and actuating fingers rigid with such bending fingers projecting into the path of travel of the blank to rock the bending fingers to perform their bending function, substantially as described.

20. In a machine of the character described, the combination of a die, a plunger adapted to force a pasteboard blank through the die to bend over its marginal portions to form the side walls of the box, means to operate said plunger, spring-retracted rocking fingers adapted to still further bend such marginal portions of the blank, and actuating fingers rigid with said rocking fingers projecting into the path of travel of the blank and adapted to rock such bending fingers to cause the latter to perform their bending function, the sides of said plunger being recessed to avoid conflict with said fingers, substantially as described.

21. In a machine of the character described, the combination of an expansible and contractible die, means to force a pasteboard blank through the die to bend over its marginal portions to constitute the sides of the box element, an expansible and contractible carrier adapted to receive the bent blank from the die, a detachable form, means to transfer the folded blank from the carrier to the form, and adjustable means to cover the blank with finishing paper while on the form, substantially as described.

22. In a machine of the character described, the combination of an expansible and contractible die, means to force a pasteboard blank through the die to bend over its marginal portions to constitute the side walls of the box, a reciprocatory rack, a supporting bar adjustably mounted on said rack, and a pair of retaining arms adjustably secured to said supporting bar and adapted to receive the folded blank from the die, substantially as described.

23. In a machine of the character described, the combination of means to feed boxes with their sides covered with a finishing material projecting beyond the edge of the box, and a stationary folder shaped to bend the finishing material over the corresponding edge of the box during the travel of the latter, substantially as described.

24. In a machine of the character described, the combination of means to feed boxes with their sides covered with a finishing material projecting beyond an edge of the box, and a stationary folder shaped to bend the finishing material over the edge of the box and against the head of the latter during the travel of the box, substantially as described.

25. In a machine of the character described, the combination of means to feed boxes with their sides covered with a finishing material which projects beyond both edges of the box-sides, and stationary folding means to fold both of said opposite projecting portions over the corresponding edges of the box-sides during the travel of the box, substantially as described.

26. In a machine of the character described, the combination of means to feed boxes having their sides covered with a finishing material projecting beyond both opposite edges of the box-sides, and stationary folding means to simultaneously fold both of such opposite projecting portions over the corresponding edges of the box-sides during the travel of the box, substantially as described.

27. In a machine of the character described, the combination of means to feed boxes with their sides covered with a finishing material projecting beyond both opposite edges of the box-sides, and stationary folding means to fold all of such projecting portions disposed longitudinally of the direction of the box feed over the corresponding edges of the box during the travel of the latter, substantially as described.

28. In a machine of the character described, the combination of means to feed boxes with their sides covered with a finishing material projecting beyond both opposite edges of the box-sides, such box resting on one of such side walls with its head disposed vertically, and a yieldingly-pressed folder adapted to bend a portion of such projecting finishing material over the corresponding edge of the box, said feeding means being adapted during a portion of its traverse to hold the said folder retracted in inoperative position, substantially as described.

29. In a machine of the character described, the combination of means to feed a box with its sides covered with a finishing material projecting beyond both opposite edges of the box-sides, such box resting on one of said side walls with its head disposed vertically, and a yieldingly-pressed member equipped with a pair of spaced folding fingers adapted to bend such oppositely projecting parts of the finishing material over the corresponding edges of the box, said feeding means being adapted during a portion of its traverse to hold said folding fingers retracted in inoperative position, substantially as described.

30. In a machine of the character described, the combination of means to feed a box with its sides covered with a finishing material projecting beyond both opposite edges of the box-sides, the box resting on one of such side walls with its head disposed vertically, means to fold the projecting finishing material over the opposite edges of the rear vertical side-wall, means to fold the opposite projecting portions of the finishing material over the opposite edges of the advance vertical side-wall, and means to fold the projecting material over the opposite edges of both of the horizontal side-walls, substantially as described.

31. In a machine of the character described, the combination of means to feed a box having its side walls covered with a finishing material projecting beyond both opposite edges of the box-sides, the box resting on one of such side walls with its head disposed vertically, means to simultaneously fold the projecting parts of the finishing material over the opposite edges of the rear vertical side-wall, over the open mouth of the box and against the head, means to simultaneously fold the projecting portions of the finishing material over the opposite edges of the advance vertical side-wall, against the box-head and over the open box-mouth, and means to simultaneously fold the projecting portions of the finishing material over both edges of both horizontal side-walls onto the head of the box and over the open mouth of the box, substantially as described.

32. In a machine of the character described, the combination of means to feed a box having its side walls covered with a finishing material projecting beyond both opposite edges of the box-sides, the box resting on one of such side walls with its head disposed vertically, means to simultaneously fold the projecting parts of the finishing material over the opposite edges of the rear vertical side-wall, over the open mouth of the box and against the head, means to simultaneously fold the projecting portions of the finishing material over the opposite edges of the advance vertical side-wall, against the box-head and over the open box-mouth, and means to simultaneously fold the projecting portions of the finishing material over both edges of both horizontal side-walls onto the head of the box and over the open mouth of the box, all of such folding operations occuring during the travel of the box, substantially as described.

33. In a machine of the character described, the combination of means to feed a box having its sides covered with a finishing material projecting beyond both opposite edges of the box side-walls, the box resting on one of such side walls with its head disposed vertically, means to simultaneously fold the projecting portions of the finishing material over the opposite edges of the rear vertical side-wall, stationary means to fold the opposite projecting portions of the finishing material over the opposite edges of the advance vertical side-wall, and stationary means to simultaneously fold the opposite projecting portions of the finishing material over the opposite edges of both horizontal side-walls, substantially as described.

34. In a machine of the character described, the combination of means to feed a box having its sides covered with a finishing material projecting beyond both opposite edges of the box side-walls, the box resting on one of such side walls with its head disposed vertically, means to simultaneously fold the projecting portions of the finishing material over the opposite edges of the rear vertical side-wall, stationary means to fold the opposite projecting portions of the finishing material over the opposite edges of the advance vertical side-wall, stationary means to simultaneously fold the opposite projecting portions of the finishing material over the opposite edges of both horizontal side-walls, and means to fold the finishing material extended over the mouth of the box down into the box and against the inner faces of its side walls, substantially as described.

35. In a machine of the character described, the combination of means to feed a box having its side walls covered with a finishing material projecting beyond both opposite edges of the side walls, the box resting on one of such side walls with its head disposed vertically, means to fold the projecting portions of the finishing material over the opposite edges of the rear vertical side-wall, stationary means adapted during the travel of the box to fold the opposite projecting portions of the finishing material over the opposite edges of the advance vertical side-wall, stationary means adapted during the travel of the box to fold the opposite projecting portions of the finishing material over the opposite edges of both horizontal side-walls, a plunger adapted to enter the box and fold the finishing material downwardly into contact with the inner faces of the side walls, an abutment against which said plunger is adapted to press the head of the box, and means to actuate said plunger, substantially as described.

36. In a machine of the character described, the combination of a plunger adapted to enter a box having its covering material folded over the edges of its side walls, to fold it into the open mouth of the box and against the inner faces of its side walls, means to actuate said plunger, and means carried by the plunger adapted to enter an adjacent box and press its side-wall as well as a wall of the box the plunger enters between itself and the plunger, substantially as described.

37. In a machine of the character described, the combination of a plunger adapted to enter a box having its covering material folded over the edges of its side walls, to fold it into the open mouth of the box and against the inner faces of its side walls, means to actuate said plunger, means carried by the plunger adapted to enter an adjacent box and press its side wall as well as a wall of the box the plunger enters between itself and the plunger, and means to advance the boxes individually into register with the plunger, the oncoming box feeding those ahead of it, substantially as described.

38. In a machine of the character described, the combination of an abutment, a plunger adapted to enter a box located in front of the abutment and having its covering material folded over the edges of its side walls, to fold it into the open mouth of the box and against the inner faces of its side walls, means to actuate said plunger to perform such folding operation and to press the head of the box against the abutment, means carried by the plunger adapted to enter an adjacent box and press its side wall as well as a wall of the box the plunger enters between itself and the plunger, and means to advance the boxes individually into register with the plunger, the oncoming box feeding those ahead of it, substantially as described.

39. In a machine of the character described, the combination of an expansible and contractible die, means to force a pasteboard blank through the die to bend over its marginal portions to constitute the side walls of the box, an expansible and contractible carrier adapted to receive the bent blank from the die, means to actuate said carrier, means permitting adjustment of the stroke of said carrier, a detachable form, means to revolve the form, means to transfer the blank from the carrier to the form, and adjustable means to cover the blank with a finishing material during the rotation of the blank, whereby the machine may produce covered boxes of different sizes by the employment of interchangeable forms, substantially as described.

40. In a machine of the character described, the combination of an expansible and contractible blank-magazine, means to individually discharge the blanks from said magazine, an expansible and contractible die, means to force blanks through the die to bend over their marginal portions to constitute the side walls of the box, an expansible and contractible carrier adapted to receive the bent blanks from the die, means to actuate said carrier, a detachable form, means to revolve the form, means to transfer the blanks from the carrier to the form, and adjustable means to cover the blanks with a finishing material during the rotation of the blanks, whereby the machine may produce covered boxes of different sizes by the employment of interchangeable forms, substantially as described.

41. In a machine of the character described, the combination of an expansible and contractible die, means to force a pasteboard blank through the die, to bend over its marginal portions to constitute the side walls of the box, an expansible and contractible carrier adapted to receive the bent blank from the die, means to actuate said carrier, means permitting adjustment of the stroke of said carrier, a detachable form, means to revolve said form, means to transfer the blank from the carrier to the form, an adhesive-coated paper-feeding device adjustable as to the width of paper handled, means to actuate said feeding device with an adjustable stroke, and means to apply the paper to the blank on the form, whereby the machine may produce covered boxes of different sizes by the employment of interchangeable forms, substantially as described.

42. In a machine of the character described, the combination of an expansible and contractible die, means to force a pasteboard blank through the die to bend over its marginal portions to constitute the side walls of the box, an expansible and contractible carrier adapted to receive the bent blank from the die, means to actuate said carrier, means permitting adjustment of the stroke of said carrier, a detachable form, means to revolve the form, means to transfer the blank from the carrier to the form, to hold it on the form during the rotation of the latter, and to remove it from the form, adjustable means to cover the blank with a finishing material during the rotation of the blank on the form, an adjustable table, and folding means carried by said table and adjustable thereon, and adapted to fold protruding portions of the finishing material over onto the head of the box and over the edges of the side walls over the mouth of the box, substantially as described.

43. In a machine of the character described, the combination of a form, means to rotate said form, means to feed a cover strip thereto, a movable support, means to move said support toward and away from the form, a presser hinged to said support having a substantially flat face adapted to bear on the covering strip to assist in its application to a bent blank on the form, and a spring acting on said presser tending to rock it on said hinge, substantially as described.

44. In a machine of the character described, the combination of a form, means to rotate said form, means to feed a covering strip thereto, a lever, means to operate said lever, a presser hinged to said lever having a substantially flat face adapted to bear on the covering strip and assist in its application to a bent blank on the form, and a spring acting on said presser tending to rock it on its hinge, substantially as described.

45. In a machine of the character described, the combination of a form, means to rotate said form, means to feed a covering strip thereto, a lever, a spring acting on said lever tending to rock it on its fulcrum, a presser hinged to said lever having a substantially flat face adapted to bear on the covering strip and assist in its application to a bent blank on the form, and a spring acting on said presser tending to rock it on its hinge, substantially as described.

46. In a machine of the character described, the combination of a form, means to rotate said form, means to feed a covering strip thereto, a lever, means to yieldingly press said lever toward the form, means to positively retract the lever, a presser hinged to said lever having a substantially flat face adapted to bear on the covering strip and assist in its application to a bent blank on the form, and a spring acting on said presser tending to rock it on its hinge, substantially as described.

47. In a machine of the character described, the combination of a pivoted bender adapted to bend the marginal portion of a pasteboard blank, means extended into the path of travel of the blank and operatively associated with said bender, and means to move the blank facewise against and past said extended means, thereby rocking the bender on its pivot to effect the bending operation, substantially as described.

48. In a machine of the character described, the combination of a plurality of pivoted benders adapted to bend different marginal portions of a pasteboard blank, means extending into the path of travel of the blank and operatively associated with said benders, and means to move the blanks facewise against and past said extended means, thereby rocking the benders on their pivots to effect the bending operation, substantially as described.

49. In a machine of the character described, the combination of a plurality of pivoted benders adapted to bend the marginal portions of a pasteboard blank and having parts extended into the path of travel of the blank, and means to move the blank facewise against and past said portions, thereby rocking the benders on their pivots to effect the bending operation, substantially as described.

50. In a machine of the character described, the combination of a plurality of pivoted benders adapted to bend the marginal portions of a pasteboard blank and having parts extended into the path of travel of the blank, spring means to retract said pivoted benders, and means to move the blank facewise against and past said portions, thereby rocking the benders on their pivots to effect the bending operation, substantially as described.

51. In a machine of the character described, the combination of a plurality of pivoted benders arranged in different planes and adapted to bend different marginal portions of a pasteboard blank, said benders having parts extended into the path of travel of the blank, and means to move the blank facewise against said portions in succession, thereby rocking the benders on their pivots and effecting the bending operations successively, substantially as described.

52. In a machine of the character described, the combination of a pair of pivoted benders adapted to bend opposite marginal portions of a pasteboard blank, a second pair of pivoted benders arranged in a different plane from that of the first pair and adapted to bend different opposite marginal portions of said pasteboard blank, means in the path of travel of the blank, actuated by the latter, and adapted to rock said pairs of benders successively to effect the bending operations in succession, and means to carry the blank facewise into engagement with and to cause the blank to operate said bender rocking means, substantially as described.

53. In a machine of the character described, the combination of a pair of movable benders adapted to bend opposite marginal portions of a pasteboard blank, a second pair of movable benders arranged in a different plane from that of the first pair and adapted to bend different opposite marginal portions of the blank, means in the path of travel of the blank, actuated by the latter and adapted to move said pairs of benders in succession to effect the bending operations in succession, and means to carry the blanks facewise into engagement with and to cause the blank to operate said bender moving means, substantially as described.

54. In a machine of the character described, the combination of a plurality of pivoted benders each having a pair of surfaces disposed at an acute angle to one another, one of said surfaces of each bender being in the path of travel of a pasteboard blank, the other surface of each bender being adapted to bend a marginal portion of the blank to a position at an acute angle to the body of the blank, and means to carry a pasteboard blank against said first mentioned surfaces and by engagement therewith rock the benders on their pivots and effect the bending operations, substantially as described.

55. In a machine of the character described, the combination of a pair of pivoted benders adapted to bend opposite marginal portions of a pasteboard blank, a second pair of pivoted benders arranged in a different plane from that of the first pair and adapted to bend different opposite marginal portions of the blank, each of said benders having a pair of surfaces disposed at an acute angle to one another, one of said surfaces of each bender being in the path of travel of a pasteboard blank, the other surface being adapted to bend a marginal portion of the blank to a position at an acute angle to the body of the blank, and means to carry a pasteboard blank against the first mentioned surfaces of said benders and by engagement therewith rock the pairs of benders on their pivots and effect the bending operations in succession, substantially as described.

56. In a machine of the character described, the combination of a pair of spring-retracted pivoted benders adapted to bend opposite marginal portions of a pasteboard blank, a second pair of spring-retracted pivoted benders arranged in a different plane from that of the first pair and adapted to bend different opposite marginal portions of the blank, each of said benders having a pair of surfaces disposed at an acute angle to one another, one of said surfaces of each bender being in the path of travel of a pasteboard blank, the other surface being adapted to bend a marginal portion of the blank to a position at an acute angle to the body of the blank, and means to carry a pasteboard blank facewise against the first mentioned surfaces of said benders and by engagement therewith rock the pairs of benders on their pivots in succession and effect the bending operations, subtantially as described.

57. In a machine for bending the flanges of blanks preparatory to making paper boxes and covers therefrom, a reciprocating male die, a female die constructed in a plurality of sections and arranged one in front of the other, bending members pivotally mounted on the sections to coöperate therewith, said members being operated by the male die to fold the flanges of the blank at less than a right angle to the body portion, substantially as described.

58. A pivoted folding member for a machine adapted for use in the manufacture of paper boxes and covers provided with material engaging portions disposed at less than a right angle to each other, the movement of the material past said member swinging the latter on its pivot to fold the adjacent portions of the material on lines having an angular relation less than a right angle, substantially as described.

59. A machine for bending and forming blanks for the manufacture of paper boxes and covers, a reciprocating punch, a die, a pair of coöperating bending members pivoted to said die and operated by the punch for bending two sides or flanges of the paper boxes or covers simultaneously, and another pair of bending members spaced therefrom and arranged at right angles to the first mentioned pair and operated by the punch to fold two sides or flanges of the paper boxes or covers simultaneously, thereby completing the bending operations on the flanges of the boxes and covers preparatory to staying the corners thereof, substantially as described.

60. In a machine for preparing scored blanks for the manufacture of paper boxes in combination, coöperative pressure and bending elements, said pressure elements directly operating the bending elements for bending flanges from the body portion along the scored lines at an acute angle thereto, and means to deliver the blanks between the pressure elements, substantially as described.

61. A machine for forming and bending blanks for the manufacture of paper boxes and covers, comprising pivoted bending elements, each having material engaging surfaces arranged at an angle less than a right angle, means for feeding an approximately flat blank to a position in front of said bending members, and means for forcing said blank into contact with and past the bending members, said latter means operating the bending members on their pivots to bend said portions of the blank at an angle to the main portion of such blank corresponding to the angular relation of the portions of the bending members, substantially as described.

62. A machine for forming and bending blanks comprising opposed pairs of pivotally mounted bending members arranged in different planes, means for feeding an approximately flat blank to one set of said bending members, and a plunger engaging the blank and forcing it into contact with and past the respective sets of bending members, the plunger in its movement directly operating the bending members to cause the latter to bend the respective side portions of the blank at an angle less than a right angle with respect to the main portion of such blank, substantially as described.

63. A machine for forming and bending blanks comprising opposed pairs of pivotally mounted bending members arranged in different planes, means for feeding an approximately flat blank to one set of said bending members, and a plunger engaging the blank and forcing it into contact with and past the respective sets of bending members, the plunger in its movement directly operating the bending members to cause the latter to bend the respective side portions of the blank at an angle less than a right angle with respect to the main portion of such blank, the side edges of the plunger being formed to permit the bending operation of the bending members, substantially as described.

64. In a machine of the character described, the combination of main stationary benders adapted to bend marginal portions of a flat box blank into positions substantially at right-angles to the main body of the blank, supplemental pivoted benders adapted to bend such portions into acute angle relation to said main-body, and a plunger adapted to carry the blank past both sets of benders to cause the bending operations, such supplemental benders having extensions projecting into the path of travel of the blank and adapted to effect the rocking of such pivoted members, substantially as described.

MICHAEL J. MILMOE.

Witnesses:
G. J. BECKER,
A. J. SAVAGE.